United States Patent [19]

Myszewski

[11] Patent Number: 6,026,497
[45] Date of Patent: Feb. 15, 2000

[54] SYSTEM AND METHOD FOR DETERMINING THE RESOLUTION OF A GRANULAR CLOCK PROVIDED BY A DIGITAL COMPUTER AND FOR USING IT TO ACCURATELY TIME EXECUTION OF COMPUTER PROGRAM FRAGMENT BY THE DIGITAL COMPUTER

[75] Inventor: Mathew J. Myszewski, Westford, Mass.

[73] Assignee: Sun Microsystems, Inc., Palo Alto, Calif.

[21] Appl. No.: 08/996,658

[22] Filed: Dec. 23, 1997

[51] Int. Cl.[7] .................................................. G06F 11/00
[52] U.S. Cl. ............................................. 713/502; 714/38
[58] Field of Search ..................... 713/500, 502; 714/38, 55, 814

[56] References Cited

U.S. PATENT DOCUMENTS

| | | | |
|---|---|---|---|
| 5,828,868 | 10/1998 | Sager et al. | 395/556 |
| 5,838,919 | 11/1998 | Schwaller et al. | 395/200.54 |
| 5,872,909 | 2/1999 | Wilner et al. | 395/183.14 |
| 5,881,237 | 3/1999 | Schwaller et al. | 395/200.54 |
| 5,884,023 | 3/1999 | Swoboda et al. | 395/183.06 |
| 5,901,155 | 5/1999 | Proulx | 371/27.1 |
| 5,915,108 | 6/1999 | Frey et al. | 395/555 |
| 5,937,165 | 8/1999 | Schwaller et al. | 395/200.54 |

*Primary Examiner*—Joseph E. Palys
*Assistant Examiner*—Omar A. Omar
*Attorney, Agent, or Firm*—Richard A. Jordan

[57] ABSTRACT

A system for facilitating determination of accurate timing of execution of a computer program fragment by a digital computer comprises a clock resolution determination subsystem and an iteration number determination subsystem. The clock resolution determination subsystem determines a clock resolution value representing a resolution of a clock provided by the digital computer. The iteration number determination subsystem uses the clock resolution value, and maximum and minimum desired time interval values, to determine an iteration number value, the iteration number representing a number of iterations for execution of the computer program fragment to provide accurate timing of the computer program fragment by the digital computer.

48 Claims, 12 Drawing Sheets

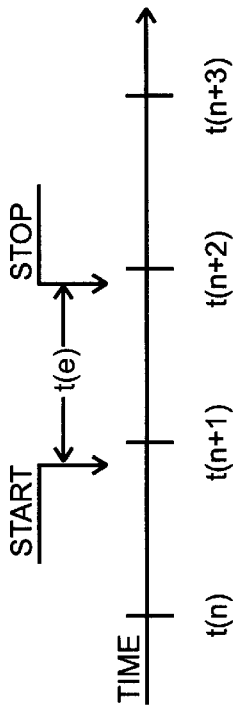
FIG.3D
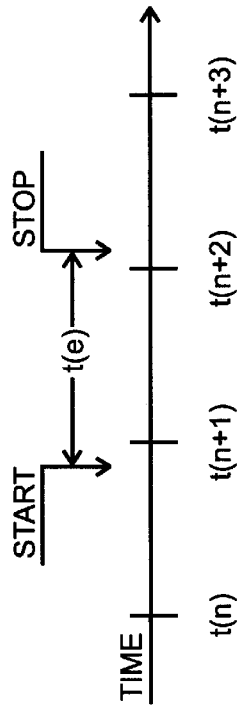
FIG.3E
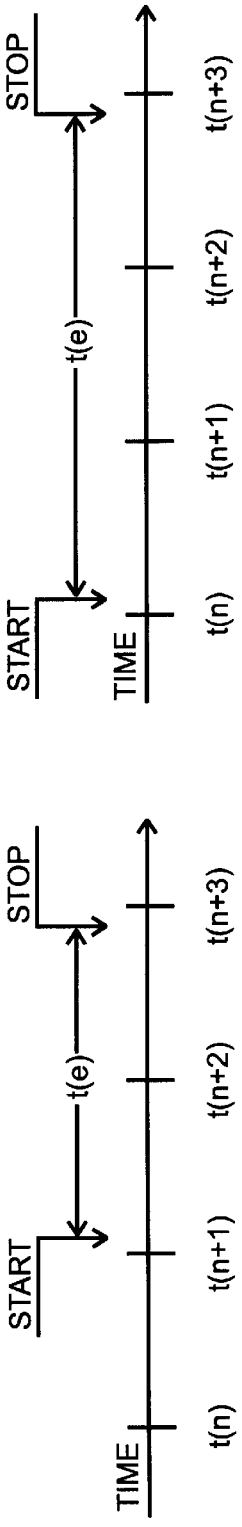
FIG.3F
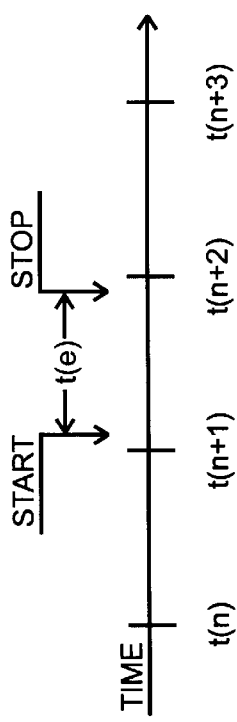
FIG.3A
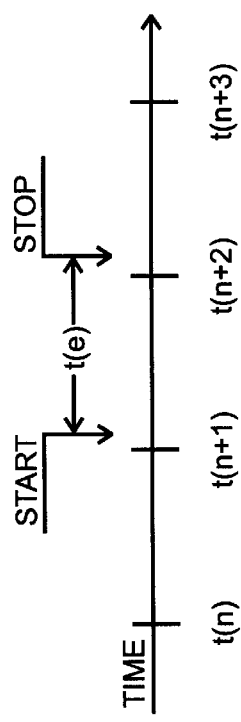
FIG.3B
FIG.3C

SYSTEM AND METHOD FOR DETERMINING THE RESOLUTION OF A GRANULAR CLOCK PROVIDED BY A DIGITAL COMPUTER AND FOR USING IT TO ACCURATELY TIME EXECUTION OF COMPUTER PROGRAM FRAGMENT BY THE DIGITAL COMPUTER

FIELD OF THE INVENTION

The invention relates generally to the field of digital computers, and more particularly to determining the time interval required for execution of a computer program or program fragment by a digital computer. The invention particularly provides a system and method for determining the number of iterations a computer program or program fragment should be executed by the digital computer to enable the time interval required for a single execution of the program or fragment to be determined with a predetermined degree of accuracy. The invention further provides a system and method for determining the resolution of a granular clock provided by the digital computer, which resolution can be used in determining that number of iterations.

BACKGROUND OF THE INVENTION

Digital computers execute a variety of diverse types of computer programs, with each program including a series of instructions that enable the computer to perform specific operations in connection with data. One problem that often arises in connection with execution of computer programs is determining, with some reasonable degree of accuracy, the amount of time that a particular computer will take to execute at least a portion of a computer program, that is, a "computer program fragment." This problem can arise in several contexts. For example, the problem can arise in the context of program development, particularly during a phase of program development in which a program developer is attempting to streamline a program or program fragment which is under development, to optimize the speed with which it will be executed by one or several types of computer platforms.

The problem can also arise in the context of benchmarking, which may be used to determine the speed of a particular type of computer system in executing a particular type of program, or, more often, to determine the relative speeds as among a number of types of computer systems in executing a particular type of program. Benchmarking is often used by, for example, by a potential customer who wishes to purchase a computer for one or several applications. In such a case, the potential customer will typically have one or more programs executed on the various types of computers under consideration for purchase. In such a case, the programs used in benchmarking may be representative of the applications that the potential customer expects to execute with the computer to be purchased, and he or she will typically select one of the types for purchase based on the execution times for the respective programs on the various types of computers. This problem of timing execution of computer programs and program fragments may also arise in other contexts. Generally, the execution time for a program or a program fragment (generally, a "program fragment") on a particular computer is determined by determining a beginning or "start" time value, executing the program one or more times or "iterations," determining an end or "stop" time value, and taking the difference between the end time value and the beginning time value. The difference between the end time value and the beginning time value indicates the amount of time, or the "time interval," during which the computer executed the program for the particular number of iterations. The time interval for executing the program fragment one time would be the time interval divided by the number of iterations the program fragment was executed. One problem that arises in connection with determining execution time is to, in turn, determine an optimal number of iterations that a program fragment should be executed to get a predetermined degree of timing accuracy, while avoiding executing the program or fragment an excessive number of iterations.

SUMMARY OF THE INVENTION

The invention in one aspect provides a new and improved system and method for determining the number of iterations a computer program or program fragment should be executed by a digital computer to enable the time interval required for a single iteration of the program or program fragment to be determined with a predetermined degree of accuracy. In another aspect, the invention provides a system and method for determining the resolution of a clock provided by a digital computer which resolution can be used in determining that number of iterations.

In brief summary, in one aspect the invention provides a system for facilitating determination of accurate timing of execution of a computer program fragment by a digital computer. The system comprises a clock resolution determination subsystem and an iteration number determination subsystem. The clock resolution determination subsystem determines a clock resolution value representing the resolution of a clock provided by the digital computer. The iteration number determination subsystem uses the clock resolution value, and maximum and minimum desired time interval values, to determine an iteration number value, the iteration number representing a number of iterations for execution of the computer program fragment to provide accurate timing of the computer program fragment by the digital computer.

In another aspect, the invention provides a clock resolution determination system for determining the resolution of a clock provided by a digital computer. The clock resolution determination system comprises a code sequence and an execution control module. The code sequence has an initial current time call for obtaining a current time value from the digital computer, a selected loop, and a final current time call for obtaining said current time value from the digital computer. The execution control module comprises a code sequence execution control, a reported time interval value generator, an iteration control, and a clock resolution value generator. The code sequence execution control enables execution of said code sequence with the selected loop being executed a selected number of selected loop iterations. The reported time interval value generator generates a reported time interval representing a difference between the current time values provided by the digital computer in response to the initial and final current time calls during execution of said code sequence. The iteration control enables the code sequence execution control and the reported time interval value generator in a series of code sequence iterations, in successive iterations changing the selected number. The clock resolution value generator generates the clock resolution value in relation to the reported time values generated by the reported time interval value generator for the respective code sequence iterations.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIGS. 3A through 3F are timing diagrams useful in understanding the operation of a clock resolution determination subsystem comprising a portion of the optimal iteration number determination system depicted in FIG. 2;

DETAILED DESCRIPTION OF AN ILLUSTRATIVE EMBODIMENT

Figure 1:
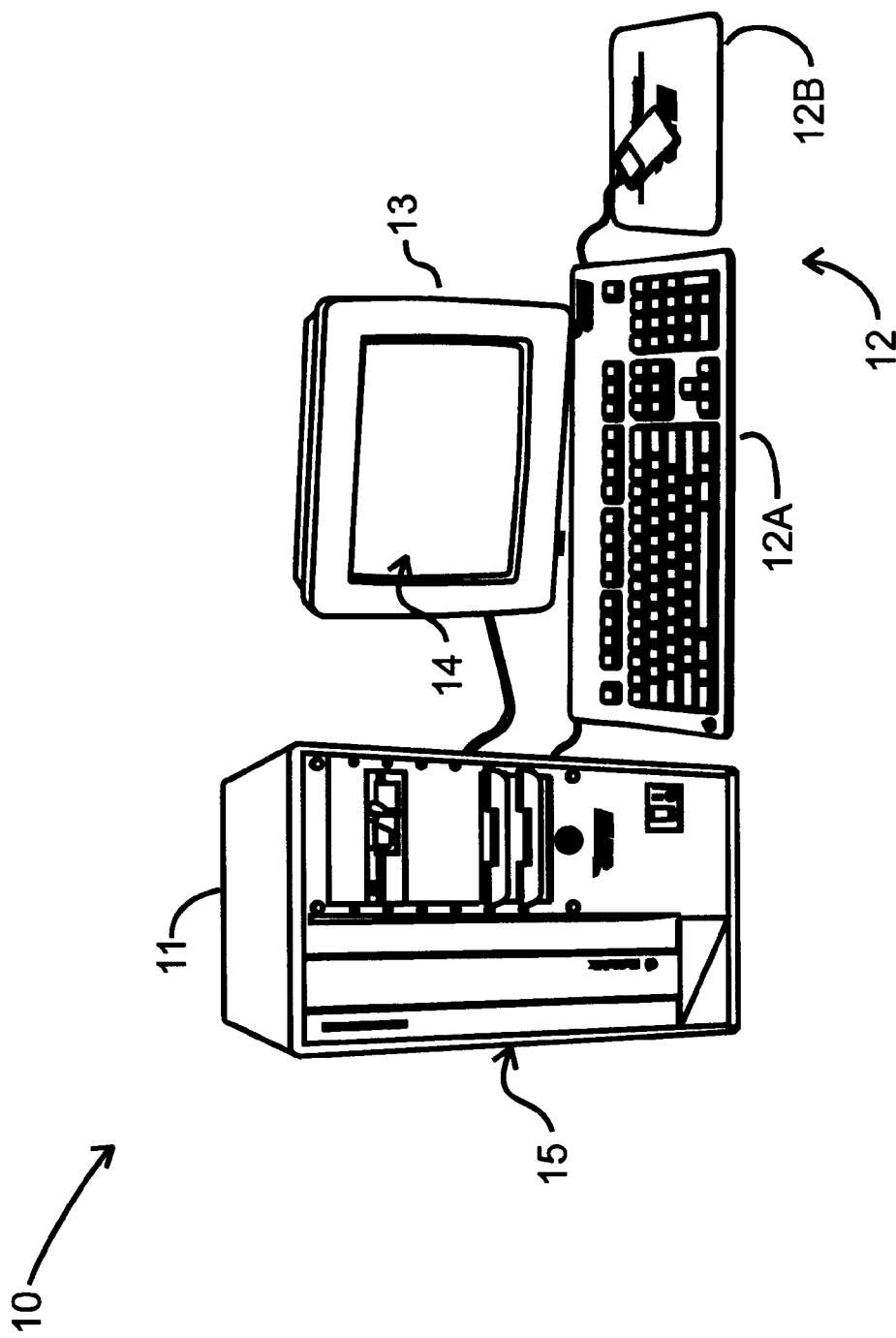
FIG. 1 is a functional block diagram of a digital computer having a granular clock including an optimal iteration number determination system constructed in accordance with the invention for determining an optimal number of times a computer program or program fragment should be executed to enable the time that is required for a single execution to be determined with a predetermined degree of accuracy.

FIG. 1 attached hereto depicts an illustrative digital computer 10 including a optimal iteration number determination system constructed in accordance with the invention for determining an optimal number of times, or iterations, a computer program or program fragment should be executed to enable the time interval that is required for a single execution of the program fragment to be determined with a predetermined degree of accuracy. With reference to FIG. 1, the computer system 10 in one embodiment includes a processor module 11 and operator interface elements comprising operator input components such as a keyboard 12A and/or a mouse 12B (generally identified as operator input element(s) 12) and an operator output element such as a video display device 13. The illustrative computer system 10 is of the conventional stored-program computer architecture. The processor module 11 includes, for example, processor, memory and mass storage devices such as magnetic and/or optical disk and/or magnetic tape storage elements (not separately shown) which perform processing and storage operations in connection with digital data provided thereto. The operator input element(s) 12 are provided to permit an operator to input information for processing. The video display device 13 is provided to display output information generated by the processor module 11 on a screen 14 to the operator, including data that the operator may input for processing, information that the operator may input to control processing, as well as information generated during processing. The processor module 11 generates information for display by the video display device 13 using a so-called "graphical user interface" ("GUI"), in which information for various applications programs is displayed using various "windows." Although the computer system 10 is shown as comprising particular components, such as the keyboard 12A and mouse 12B for receiving input information from an operator, and a video display device 13 for displaying output information to the operator, it will be appreciated that the computer system 10 may include a variety of components in addition to or instead of those depicted in FIG. 1.

In addition, the processor module 11 includes one or more network ports, generally identified by reference numeral 15, which are connected to communication links which connect the computer system 10 in a computer network. The network ports enable the computer system 10 to transmit information to, and receive information from, other computer systems and other devices in the network. In a typical network organized according to, for example, the client-server paradigm, certain computer systems in the network are designated as servers, which store data and programs (generally, "information") for processing by the other, client computer systems, thereby to enable the client computer systems to conveniently share the information. A client computer system which needs access to information maintained by a particular server will enable the server to download the information to it over the network. After processing the data, the client computer system may also return the processed data to the server for storage. In addition to computer systems (including the above-described servers and clients), a network may also include, for example, printers and facsimile devices, digital audio or video storage and distribution devices, and the like, which may be shared among the various computer systems connected in the network. The communication links interconnecting the computer systems in the network may, as is conventional, comprise any convenient information-carrying medium, including wires, optical fibers or other media for carrying signals among the computer systems. Computer systems transfer information over the network by means of messages transferred over the communication links, with each message including information and an identifier identifying the device to receive the message.

Figure 2:
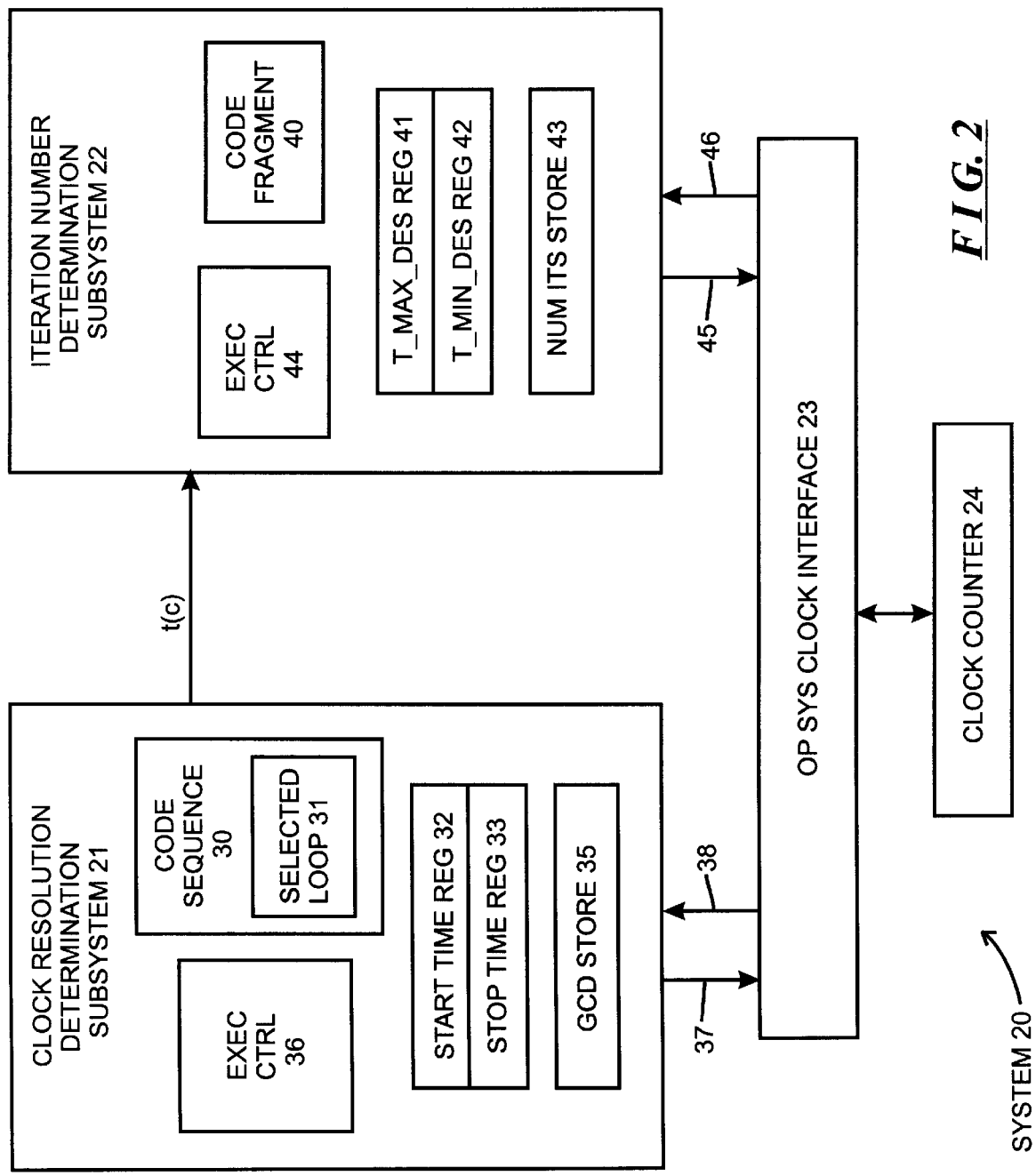
FIG. 2 is a functional block diagram of the optimal iteration number determination system used in the computer system depicted in FIG. 1.

The invention provides an optimal iteration number determination system for determining an optimal number of iterations a computer program or program fragment (collectively referred to has a "program fragment") should be executed to enable the time interval that is required for a single iteration to be determined with a predetermined degree of accuracy. The number of iterations value that is generated by the optimal iteration number determination system will be identified herein as an "optimal" iteration number value. A functional block diagram of such an optimal iteration number determination system, identified by reference numeral 20, is depicted in FIG. 2. With reference to FIG. 2, the system 20 includes two sections, including a clock resolution determination subsystem 21 and an iteration number determination subsystem 22. The system 20 makes use of several elements provided by the computer 10, most notably a clock interface 23 provided by the operating system controlling computer 10, and a clock counter 24. The clock counter 24 may be provided by the operating system, by the computer's hardware, or a combination thereof.

The clock resolution determination subsystem 21 determines the resolution of the timing values of the clock that is provided the computer 10. By way of background, a computer, such as computer 10, provides a real time clock that, in response to a request from a program executing thereon, provides the current, or "real-time," time value. An application program, for example, being processed by the computer 10 can determine the current time by making a predetermined call to the operating system's clock interface 23. Generally, the real time clock is implemented by a counter, such as clock counter 24, which is periodically incremented. The counter 24 provides a count value that the operating system's clock interface 23, in response to the predetermined call, can process to provide a value representing the current time. Typically, the value returned by the operating system's clock interface 23 to the application program is an integer that represents the current time to a predetermined degree of granularity, or resolution, such as seconds, tens of milliseconds, milliseconds, or the like, which the application program can further process as necessary to represent the current time in the conventional "hours:minutes:seconds:fractional_seconds" format for, for example, inclusion in a file or display to an operator. The granularity of the current time as represented by the integer returned by the clock interface 23 may depend on the particular call made by the application program, and it (that is, the granularity) may also differ from the granularity as provided by the clock counter 24. In the following, unless indicated otherwise, it will be assumed that the granularity of the integer as provided by the clock interface 23 corresponds to that provided by the clock counter 24.

A problem that arises in such an arrangement is that the time interval between points in time at which the counter 24 will be incremented, referred to herein as t(c), and conversely the amount by which the counter 24 will be incremented each time it is incremented, can vary as among computers and also as among operating systems and versions of operating systems used with respective computers. This, in turn, can affect the resolution of the time value provided by the operating system in response to a call. Thus, for example, for an operating system call to the clock interface 23 requesting a value representative of the current time in milliseconds (that is, $10^{-3}$ seconds), if a computer provides a clock which has a relatively high resolution, the counter 24 may be incremented every millisecond. In that case, the integer that would be returned by the operating system would be incremented every millisecond, and the incrementation value would be one. On the other hand, if a computer provides a clock which has a lower resolution, the counter 24 may be incremented every ten, fifty, or more milliseconds, the incrementation value would be ten, fifty, and so forth, respectively. The clock resolution determination subsystem 21 determines the resolution of the time value that is provided by the clock interface 23, that is, the amount by which the integer representing the current time is incremented each time it is incremented.

With this background, the clock resolution determination subsystem 21 includes a code sequence 30 including a selected loop 31, a start time register 32, a stop time register 33, a gcd store 35 and an execution control module 36. The clock resolution determination subsystem 21 uses the code sequence 30 to determine the time interval, within a resolution determined by the granularity of the time values provided by clock interface 23, required for the computer 10 to execute the selected loop. The code sequence 30 comprises a sequence of instructions such as the following (i) OpSysCallCurrentTime
(ii) Save Current Time Register(StartTime)
(iii) Execute Selected Loop 31 "n" Times
(iv) OpSysCallCurrentTime
(v) Save Current Time Register (StopTime)
(vi) GenTimeInterval(StopTime-StartTime)

In line (i), the code sequence 30 enables the execution control module 36 to issue the operating system call, described above, to the clock interface 23, the call being represented in FIG. 2 by arrow 37, to obtain the current time. The clock interface 23 responds with an integer representative of the current time, the response being represented in FIG. 2 by arrow 38. In line (ii), the code sequence 30 enables the execution control module 36 to save the response in the start time register 32. Thereafter, the code sequence 30 in line (iii) enables the execution control module 36 to execute the selected loop 31 a selected number "n" of iterations. (The number of times the selected loop 31 is executed will be described below.) In line (iv), the code sequence 30 enables the execution control module 36 to again issue the operating system call to the clock interface 23 to obtain the current time, and the clock interface 23 responds with an integer representative of the current time at that point in time. It will be appreciated that the response to the call issued in response to line (iv) of the code sequence 30 will represent the current time as of the end of the execution of the selected loop 31, whereas the response to the call issued in response to line (i) of the code sequence 30 will represent the current time as of the start of the selected loop 31. The code sequence 30 thereafter, in line (v) enables the execution control module 36 to save the integer returned by the clock interface 23 in response to the call in line (iv) in the stop time register 33. In line (vi), the code sequence 30 enables the execution control module 36 to generate the a reported time interval value representative of the time interval for the execution of the code fragment, t(r), as the difference between the stop time saved during execution of line (v) of the code sequence, and the start time saved during execution of line (ii) of the code sequence, that is, $$t(r)=t(\text{stop})-t(\text{start}) \qquad (1)$$

It will be appreciated that the reported time interval, t(r), based on the saved start and stop times stored in registers 32 and 33, respectively, may differ from the actual time interval t(e) that was required to execute the selected loop 31 (line (iii) above). This will be illustrated in connection with FIGS. 3A through 3F.

FIGS. 3A through 3F depict time lines for showing various scenarios for execution of the line (iii) of the code sequence 30 by computer 10. (In the following, execution of line (iii) of code sequence 30, that is, execution of the selected loop 31 for "n" iterations, will be generally referred to as "selected loop execution.") In each of FIGS. 3A through 3F, the horizontal arrow represents time, with time increasing in the direction of the respective arrow, that is, towards the right as shown in the respective FIG. Each of FIGS. 3A through 3F essentially depicts a time interval over which the computer's clock counter starts at a time t(n) and increments three times, identified by t(n+1), t(n+2) and t(n+3) at successive incrementation times for the counter 24. The time interval t(n+i+1)−t(n+i) (i=0,1,2) corresponds to the clock incrementation time interval t(c). For each of the scenarios in FIGS. 3A through 3F, the actual times for the beginning and end of selected loop execution are identified by the arrows labeled "START" and "STOP," respectively. (More precisely, the arrow labeled "START" would reflect the time at which line (i) of the code sequence above would be executed, and the arrow "STOP" would reflect the time at which line (iv) of the code sequence would be executed.) The time between the "START" and "STOP" arrows, t(e), represents the selected loop execution time interval t(e), which is the actual time over which the selected loop 31 will be executed for the "n" iterations. (More precisely, "t(e)" represents the time interval for execution of lines (ii) and (iii) of the code sequence.)

Thus, with reference to FIG. 3A, that FIG. depicts a scenario in which the time for the beginning of selected loop execution, identified by the arrow labeled START, is shortly after time t(n+1), and the time for the end of selected loop execution, identified by the arrow labeled STOP, is shortly before time t(n+2). Thus, the time interval t(e) required for selected loop execution will be somewhat less than the clock incrementation time interval t(c) for the counter 24. In that case, the clock interface 23, in response to the calls at lines (i) and (iv) of the code sequence 30, would provide the time value t(n+1) at both the beginning and end of selected loop execution, in which case, with reference to equation (1) above, both t(start) and t(stop) (reference equation (1)) would have the value t(n+1). Accordingly, although the actual selected loop execution time, t(e), would be non-zero, the reported time interval t(r) for the selected loop execution, determined in accordance with equation (1) above, would be zero.

With reference to FIG. 3B, that FIG. depicts a scenario in which the time for the beginning of selected loop execution, identified by the arrow labeled START, is after time t(n+1), and the time for the end of selected loop execution, identified by the arrow labeled STOP, is after time t(n+2), with the selected loop execution time interval t(e) generally being on the order of or slightly greater than the incrementation time interval t(c) for the counter 24. In that case, the clock interface 23 would provide the time value t(n+1) at the beginning of selected loop execution and the time value t(n+2) at the end of selected loop execution. Thus, with reference to equation (1) above, t(start) would have the value t(n+1) and t(stop) would have the value t(n+2), and so the reported time interval t(r) for the selected loop execution, determined in accordance with equation (1) above, would be one.

It will be appreciated that, for the selected loop whose execution is described above in connection with FIG. 3A, that is, the selected loop whose selected loop execution time interval t(e) is somewhat less than the clock counter incrementation interval t(c), a reported time interval of "one" may also be generated, in accordance with equation (1) above, if the time for the beginning of selected loop execution is delayed from that depicted in FIG. 3A, by an amount sufficient to cause the time for the end of selected loop execution to be delayed until after time t(n+2).

With reference to FIG. 3C, that FIG. depicts a scenario in which the time for the beginning of selected loop execution, identified by the arrow labeled START, is after time t(n+1), and the time for the end of selected loop execution, identified by the arrow labeled STOP, is after time t(n+2) and shortly before time t(n+3). In that case, the selected loop execution time interval t(e) is on the order of almost twice the counter incrementation time interval t(c). In that case, the clock interface 23 would provide the time value t(n+1) at the beginning of selected loop execution and the time value t(n+2) at the end of selected loop execution, so that, with reference to equation (1) above, t(start) would have the value t(n+1) and t(stop) would have the value t(n+2). Accordingly, the reported time interval t(r) for the selected loop execution, determined in accordance with equation (1) above, would be one, as in the scenario described above in connection with FIG. 3B, even though the selected loop execution time interval t(e) is on the order of almost twice the counter incrementation time interval t(c).

FIG. 3D depicts a scenario for the execution of the selected loop that, like the selected loop execution described above in connection with FIG. 3B, has a selected loop execution time interval t(e) on the order of or slightly greater than the counter incrementation time interval t(c). In the scenario depicted in FIG. 3D, however, the time for the beginning of selected loop execution, identified by the arrow labeled START, is shortly before time t(n+1), and the time for the end of selected loop execution, identified by the arrow labeled STOP, is shortly before time t(n+2). In that case, the clock interface 23 would provide the time value t(n) at the beginning of selected loop execution and the time value t(n+1) at the end of selected loop execution. That is, with reference to equation (1) above, t(start) would have the value t(n) and t(stop) would have the value t(n+1). As with the scenario described above in connection with FIG. 3B, the reported time interval t(r) for the selected loop execution, determined in accordance with equation (1) above, would be one.

FIG. 3E depicts a scenario for the execution of the selected loop that has a selected loop execution time interval t(e) on the order of slightly greater than the counter incrementation time interval t(c). In the scenario depicted in FIG. 3E, the time for the beginning of selected loop execution, identified by the arrow labeled START, is shortly before time t(n+1), and the time for the end of selected loop execution, identified by the arrow labeled STOP, is shortly after time t(n+2). In that case, the clock interface 23 would provide the time value t(n) at the beginning of selected loop execution and the time value t(n+2) at the end of selected loop execution. That is, with reference to equation (1) above, t(start) would have the value t(n) and t(stop) would have the value t(n+2), and in that case the reported time interval t(r) for the selected loop execution, determined in accordance with equation (1) above, would be two.

Finally, FIG. 3F depicts a scenario for the execution of the selected loop that has a selected loop execution time interval t(e) on the order of slightly less than three times the counter incrementation time interval t(c). In the scenario depicted in FIG. 3F, the time for the beginning of selected loop execution, identified by the arrow labeled START, is shortly after time t(n), and the time for the end of selected loop execution, identified by the arrow labeled STOP, is shortly before time t(n+3). In that case, the clock interface 23 would provide the time value t(n) at the beginning of selected loop execution and the time value t(n+2) at the end of selected loop execution. That is, with reference to equation (1) above, t(start) would have the value t(n) and t(stop) would have the value t(n+2). As with the scenario described above in connection with FIG. 3E, the reported time interval t(r) for the selected loop execution, determined in accordance with equation (1) above, would also be two.

It will be apparent from the scenarios described above in connection with FIGS. 3A through 3F that the reported time t(r) for execution of a selected loop will be a function not only of the actual time t(e) required to execute the selected loop, but also the particular point in time at which execution of the selected loop begins, relative to the point in time at which the counter for the clock for the computer will be incremented. Thus, if the selected loop execution time t(e) is shorter than the counter incrementation time interval t(c), the reported time t(r) for the execution of the selected loop may be either zero or at most one, as described above in connection with FIGS. 3A and 3B. On the other hand, if the selected loop execution time t(e) is greater than or equal to the counter incrementation time interval t(c) and less than 2t(c), the reported time t(r) may be either one, as described above in connection with FIGS. 3B and 3D, or two, as described above in connection with FIG. 3E. In addition, if the selected loop execution time t(e) is greater than or equal to twice the counter incrementation time interval t(c) and less than 3t(c), the reported time t(r) may be either one, as described above in connection with FIG. 3C, or two. Finally, if the selected loop execution time t(e) greater than or equal to three times the counter incrementation time interval t(c) and less than 4t(c), the reported time t(r) may be either two, as described above in connection with FIG. 3F, or three. Thus, extrapolating from the scenarios described in connection with FIGS. 3A through 3F, the reported time t(r) is given by $$\text{floor}(t(e),t(c)) \geq t(r) \geq \text{ceiling}(t(e),t(c)) \qquad (2)$$

where "floor(t(e),t(c))" is the largest multiple of t(c) that does not exceed t(e) (which corresponds to the greatest integer in t(e) divided by t(c)), and "ceiling(t(e),t(c))" is the smallest multiple of t(c) that is at least as large as t(e). Otherwise stated, the actual selected loop execution time t(e) will be between the reported time t(r), plus or minus t(c), or $$t(r)-t(c) \geq t(e) < t(r)+t(c) \qquad (3)$$

Figure 4:
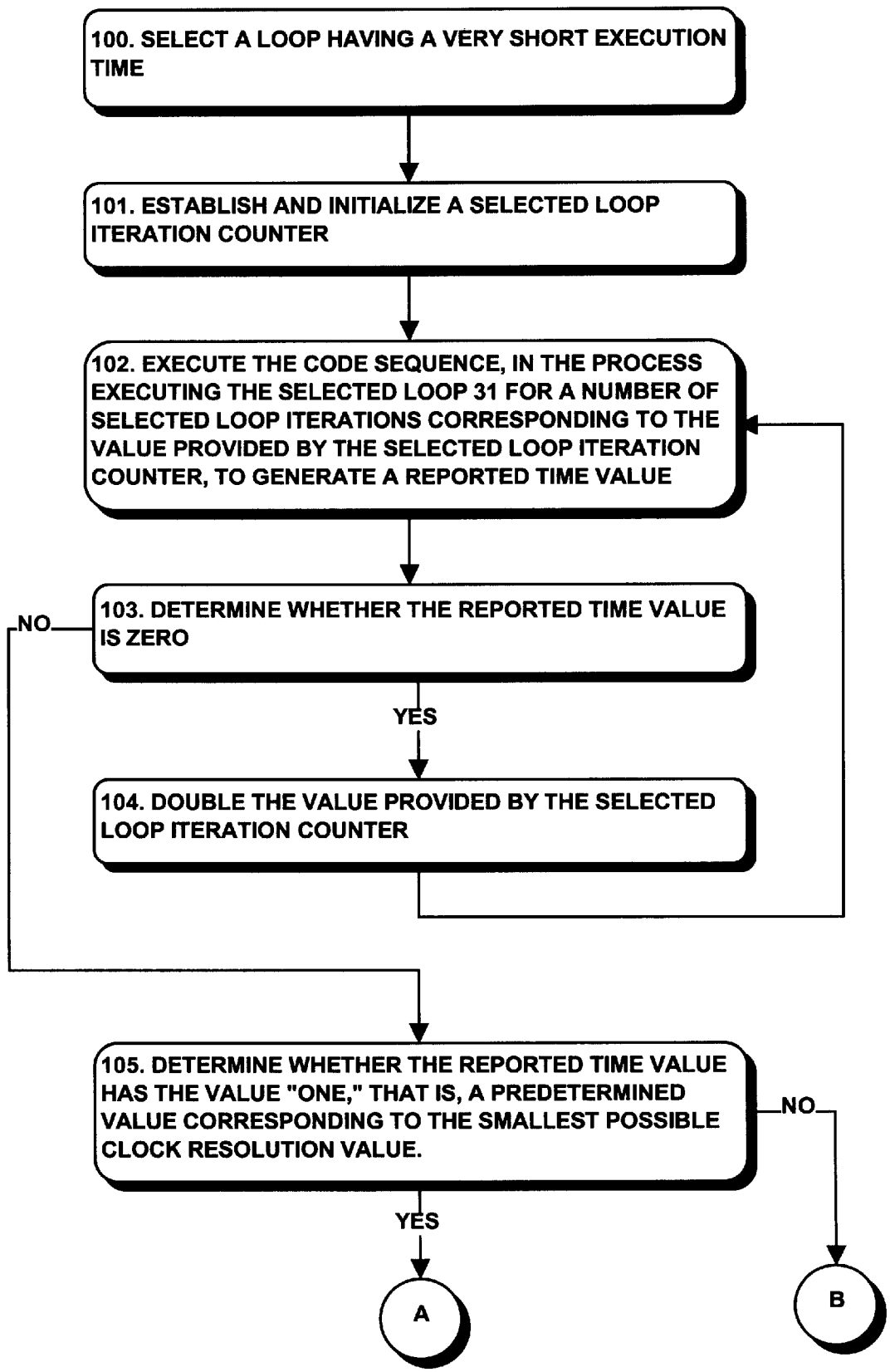
FIGS. 4, 4A, 4B, 5, 5A and 5B are flowcharts depicting operations performed by the clock resolution determination subsystem.
Figure 4A:
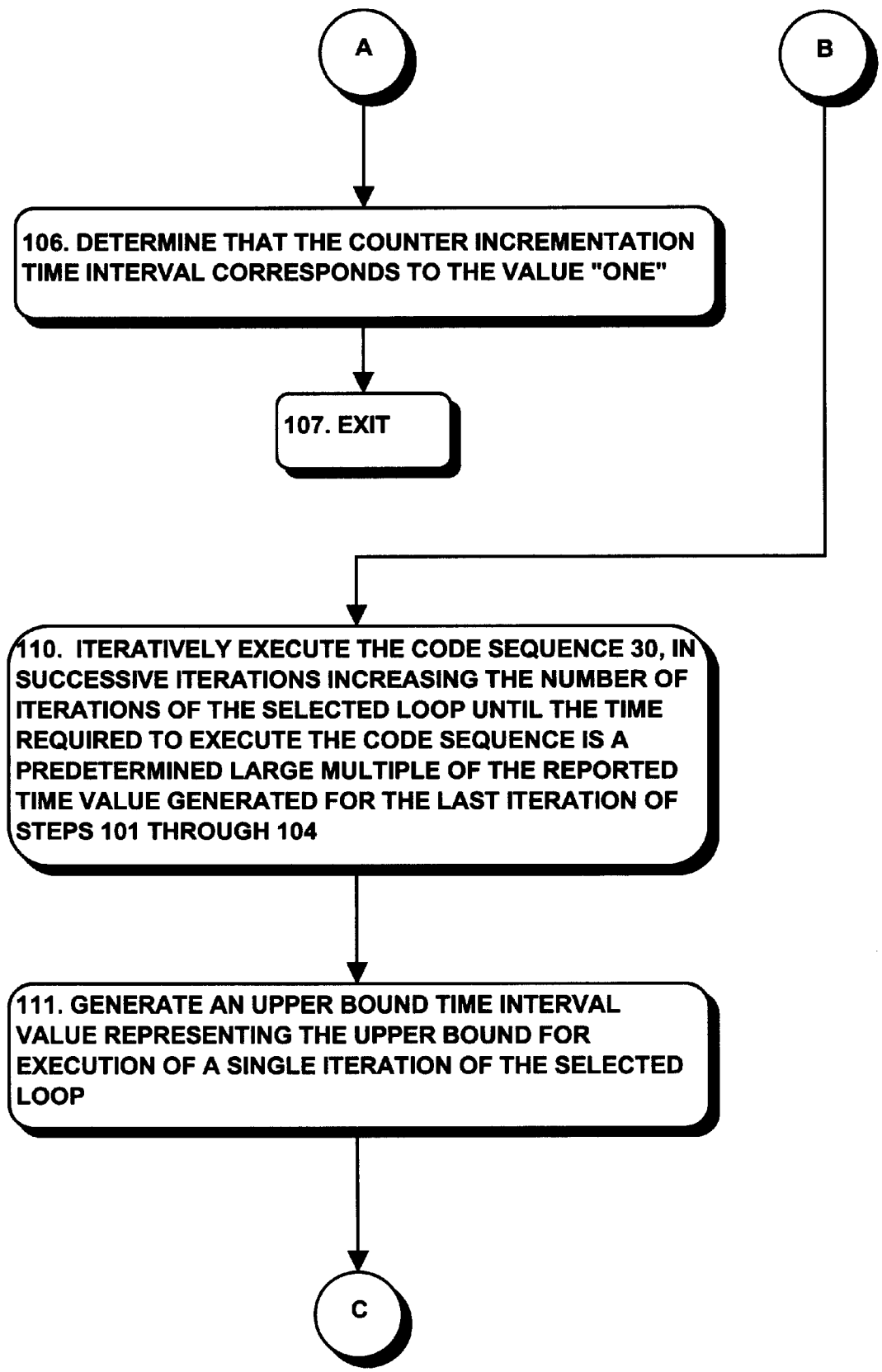
Figure 4B:
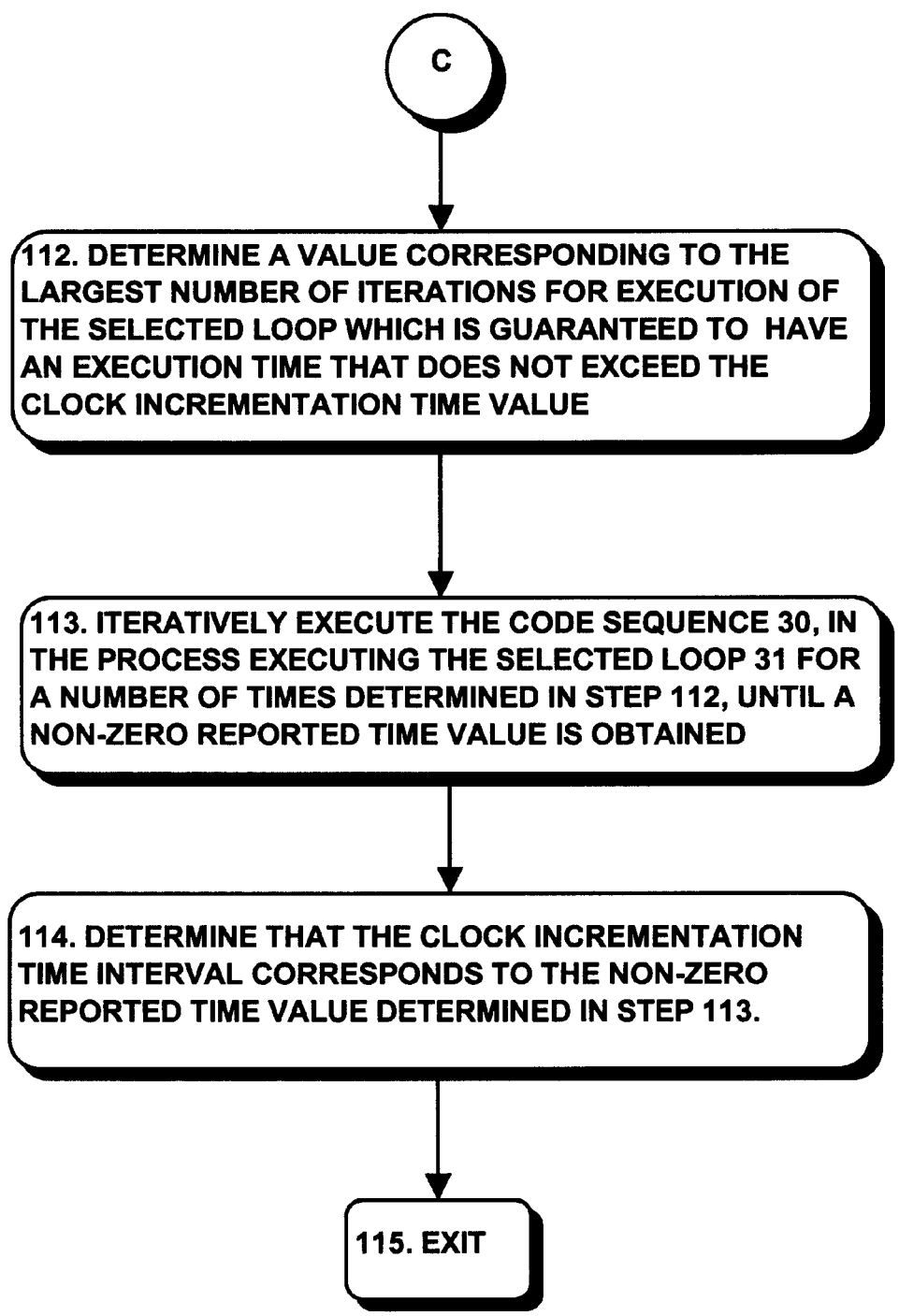

With this background, the operations performed by the clock resolution determination subsystem 21, under control of the execution control module 36, to determine the resolution of the clock provided by computer 10 will be described in connection with the flowchart in FIG. 4. With reference to FIG. 4, the clock resolution determination subsystem 21 performs a series of iterations, in each iteration, executing the code sequence described above (lines (i) through (vi)), with the selected loop 31 comprising a loop having a very short execution time. In the first iteration, the clock resolution determination subsystem 21 will execute the selected loop once, and will increase the number of iterations of the selected loop 31 that will be executed for each successive code sequence iteration, until it generates a non-zero reported time value t(r) in line (vi) of the code sequence. The selected loop 31 is selected so that the time interval required for its execution will be smaller than the clock incrementation time interval t(c), and preferably much smaller; in one embodiment, the selected loop is on the order of a few instructions executed by computer 10. In addition, in one embodiment, in each code sequence iteration after the first code sequence iteration, the clock resolution determination subsystem 21 will double the number of selected loop iterations from the previous code sequence iteration, so that after the clock resolution determination subsystem 21 executes the selected loop 31 one selected loop iteration during the first code sequence iteration, in the second code sequence iteration the selected loop 31 will be executed for two selected loop iterations, in the third code sequence iteration the selected loop 31 will be executed four selected loop iterations, and so forth; thus, for the $n^{th}$ code sequence iteration, the selected loop will be executed $2^{n-1}$ selected loop iterations.

Thus, and with reference to FIG. 4, the clock resolution determination subsystem 21 will initially select a loop having a very short execution time for use in the code sequence described above (step 100) and establish and initialize a selected loop iteration counter (not separately shown) (step 101). Thereafter, the clock resolution determination subsystem 21 will execute the code sequence, executing the selected loop 31 for a number of selected loop iterations corresponding to the value provided by the selected loop iteration counter, to generate the reported time value t(r) (step 102). The clock resolution determination subsystem 21 will then determine whether the reported time value t(r) is zero (step 103). If the clock resolution determination subsystem 21 makes a positive determination in step 103, that is, if it determines that the reported time value t(r) is zero, it will double the value provided by the selected loop iteration counter (step 104), and return to step 102.

The clock resolution determination subsystem 21 will iteratively perform steps 102 through 104 through a plurality of iterations, until it makes a negative determination in step 103, that is, until it determines in that step that the reported time value t(r) is not zero. It will be appreciated that, in that case, the reported time value t(r) will either correspond to the counter incrementation time interval t(c), or to twice t(c). This will be appreciated with reference to FIGS. 3A through 3E, as described above. If, for example, during a particular iteration, the clock resolution determination subsystem 21 generates a reported time interval t(r) having a value of zero, the actual execution time t(e) will be strictly less than the counter incrementation time interval t(c) and the start and stop times for the loop, executed for the number of times associated with the iteration, will be generally as depicted in FIG. 3A. For the next iteration, which is the first iteration for which the clock resolution determination subsystem 21 generates a non-zero reported time value t(r), the actual execution time t(e) may also be less than t(c), but in any case t(e) will be less than twice t(c) since the actual execution time for the previous iteration (that is, the iteration during which one-half the number of selected loop iterations was executed) was strictly less than t(c). Accordingly, in that next iteration (that is, the first iteration for which the clock resolution determination subsystem 21 generates a non-zero reported time value t(r)) the start and stop times may be as shown in (a) FIG. 3B or FIG. 3C, if the start time t(start) for the code sequence is shortly after the time t(n+1) at which the computer's clock counter is incremented;

(b) FIG. 3D, if the start time t(start) for the code sequence is before the time t(n+1) at which the computer's clock counter is incremented, by an amount so that the stop time t(stop) is before time t(n+2); or (c) FIG. 3E, if the start time t(start) for the code sequence is before the time t(n+1) at which the computer's clock counter is incremented, but by an amount so that the stop time t(stop) is after the time t(n+2).

Thus, if the start and stop times t(start) and t(stop) in the first code sequence iteration for which a non-zero reported time value t(r) is generated, are as shown in FIGS. 3B, 3C or 3D, the reported time value t(r) will have a value corresponding to the counter incrementation time interval t(c). On the other hand, if the start and stop times t(start) and t(stop) in the first iteration for which a non-zero reported time value t(r) is generated, are as shown in FIGS. 3E, then the reported time value t(r) will have a value corresponding to twice the counter incrementation time interval t(c).

Thus, and returning to FIG. 4, when the clock resolution determination subsystem 21 determines in step 103 of one iteration that the reported time value t(r) is non-zero, it will sequence to step 105 to determine whether the reported time value t(r) has the value "one," that is, a predetermined value corresponding to the smallest possible clock resolution value. If the clock resolution determination subsystem 21 makes a positive determination in step 105, then (a) the reported time value t(r) generated for the iteration will correspond to the counter incrementation time interval t(c), which can occur if the start and stop times t(start) and t(stop), relative to the times at which the computer's clock counter is incremented, are as described above in connection with FIGS. 3B through 3D, and (b) the counter incrementation time interval t(c) for the computer 10 corresponds to the smallest possible clock counter incrementation value.

Accordingly, if the clock resolution determination subsystem 21 makes a positive determination in step 105, it will determine that the counter incrementation time interval t(c) corresponds to the value "one" (step 106) and exit (step 107).

Returning to step 105, if the clock resolution determination subsystem 21 makes a negative determination in that step, that is, if it determines that the reported time value does not have the value "one," it proceeds to a series of additional steps to determine the counter incrementation time interval t(c). It will be appreciated that this may occur if (a) the reported time value t(r) generated for the iteration will correspond to twice the counter incrementation time interval t(c), which can occur if the start and stop times t(start) and t(stop), relative to the times at which the computer's clock counter is incremented, are as described above in connection with FIG. 3E, or (b) the counter incrementation time interval t(c) for the computer 10 does not correspond to "one," the smallest possible clock counter incrementation value, or both. In that case, the clock resolution determination subsystem 21 will initially determine a value for the upper bound of the amount of time required for the computer 10 to execute one iteration of the code sequence 30, with the selected loop 31 being executed once. To do that, following step 105, the clock resolution determination subsystem 21 performs a step 110 in which it iteratively executes the code sequence 30, in successive iterations increasing the number of iterations of the selected loop until the time required to execute the code sequence is a predetermined large multiple of the reported time value t(r) generated for the last iteration of steps 101 through 104. Following step 110, the clock resolution determination subsystem 21 generates the upper bound t(up_bd) as $$t(up\_bd) = \frac{t(n) + t(a)}{n} \quad (4)$$

where "t(a)" represents the reported time value t(r) for the last iteration of steps 101 through 104, that is, the first iteration for which the reported time value t(r) was non-zero, "t(n)" represents the reported time value t(r) for the last iteration of the code sequence in step 110, and "n" represents the number of times the selected loop was executed in the last iteration of the code sequence in step 110. Equation (4) follows from equation (3), in particular since t(a), the reported time value t(r) for the last iteration of steps 101 through 104, is at least as large as the counter incrementation time interval t(c), thus, if t($e_x$) represents the execution time required for the computer 10 to execute the selected loop once, then the execution time for "n" iterations is, from equation (3)

$$t(n)-t(a) \geq nt(e_x) < t(n)+t(a) \quad (5)$$

Thus, $$t(e_x) < \frac{t(n) + t(a)}{n}, \quad (6)$$

in which case an upper bound for t($e_x$), t(up_bd), is as given in equation (4) above.

Following step 110, the clock resolution determination subsystem 21 uses t(a), the reported time value t(r) for the last iteration of steps 102 through 104, and thus the first non-zero reported time value t(r) during execution of steps 102 through 104, and t(up_bd), the upper bound for the time for execution of one iteration, to determine a value corresponding to the largest number of iterations, $n_t$, for execution of the loop which is guaranteed to have an execution time that does not exceed t(c), the clock resolution of the computer 10 (step 111). In step 111, the clock resolution determination subsystem 21 determines $n_t$ as $$n_t = floor\left(\frac{t(a)}{2t(up\_bd)}, 1\right), \quad (7)$$

that is, "$n_t$" is the largest multiple of "one" that does not exceed t(a)/t(up_bd), that is, the integer part of t(a)/(2t(up_bd)). Determining $n_t$ in accordance with equation (7) will provide a value such that, if the code sequence 30 is executed with the selected loop 31 being executed $n_t$ times, the execution time t(e) is ensured to be $$\sim \frac{1}{2}t(c) \geq t(e) < t(c) \quad (8)$$

(where "~" represents "approximately") that is, less than the counter incrementation time interval t(c), and greater than approximately one-half the clock resolution time interval (step 112), more specifically greater than a value somewhat less than ½ t(c).

After step 112, the clock resolution determination subsystem 21 iteratively executes the code sequence 30, in the process executing the selected loop 31 for a number of times corresponding to $n_t$ determined in step 112, until a non-zero reported time value t(r) is obtained (step 113), which reported time value will correspond to the clock incrementation time value (step 114). As described above in connection with step 11 1 and equation (7), $n_t$ corresponds to the largest number of iterations of the selected loop which is guaranteed to have an execution time t(e) which is less than the clock resolution time interval t(c) of the computer, which, in turn, ensures that both the start and stop times t(start) and t(stop) of the code sequence (a) either
(i) can be within the time interval between the points in time at which the computer's clock counter is incremented, in a manner similar to the scenario described above in connection with FIG. 3A, or
(ii) may also be in successive time intervals, in a manner similar to the scenario described above in connection with FIG. 3B, but (b) can not be in more widely separated time intervals, in a manner similar to the scenarios described above in connection with FIGS. 3E and 3F, because the execution time t(e) for the code sequence 30, which is ensured to be less than the counter incrementation time interval t(c), will not be long enough. Thus, the first non-zero reported time value t(r) in step 113 will correspond to the counter incrementation time interval t(c) for the computer 10.

It will be appreciated that, with the operations described above in connection with steps 100 through 105 and 110 through 113, the clock resolution determination subsystem 21 can efficiently and reliably determine the clock resolution time interval for the clock for computer 10 if (a) the clock counter 24 does not provide a higher-resolution value that is rounded by the clock interface 23; and (b) the reported time value t(r) generated by the clock resolution determination subsystem 21 only reflects the execution of the code sequence including the selected loop.

With respect to (a), that is, if the clock counter 24 does provide a higher resolution value that is rounded by the clock interface, this can occur if, for each incrementation time interval, that is, each time interval t(n) to t(n+1), t(n+1)

to t(n+2), and so forth, as provided by the clock interface 23 to the clock resolution determination subsystem 21, the clock counter 24 increments a predetermined number of times, thereby to provide an integer that represents a timing value that is finer-grained, and thus of higher resolution than that provided by the clock interface 23. In that case, with reference to FIGS. 3A through 3F, if, for example, the time "t" as represented by the value provided by the clock counter 24, is $$t(n+1) - \frac{t(c)}{2} < t \le t(n+1) + \frac{t(c)}{2}, \qquad (9)$$

then the clock interface 23 would provide the value t(n+1), if "t" is $$t(n+2) - \frac{t(c)}{2} < t \le t(n+2) + \frac{t(c)}{2}, \qquad (10)$$

then the clock interface 23 would provide the value t(n+2), and so forth. In that case, equation (3) becomes $$t(r) - \frac{t(c)}{2} \le t(e) < t(r) + \frac{t(c)}{2} \qquad (11)$$

and so the value for $n_t$ generated in accordance with equation (7) (step 110, above) may fall in a range having a lower bound than that indicated in equation (8), and, indeed, can be lower than t(c)/2. In that case, if the clock resolution determination subsystem 21 generates such a value for $n_t$, then, in steps 112 and 113 it (that is, the clock resolution determination subsystem 21) may never, when executing the code sequence 30 with the selected loop 31 being executed $n_t$ times, determine a non-zero value for the reported time value.

To accommodate that possibility, the clock resolution determination subsystem 21 in one embodiment performs steps 112 and 113 a predetermined number of times and, if no non-zero reported time value t(r) is generated, it will determine that the clock interface 23 is performing rounding and that the value for $n_t$ generated in step 110 is, indeed, such that, if the selected loop 31 is executed $n_t$ times, the execution time t(e) will be lower than t(c)/2. In that case, the clock resolution determination subsystem 21 will double $n_t$ and execute steps 112 and 113 using the new value of $n_t$. The new value for $n_t$ will still ensure that, if the selected loop 31 is executed a number of times corresponding to the new value of $n_t$, the execution time t(e) will still be less than the clock incrementation time interval t(c), and so at some point, execution of the code sequence 30 with the selected loop 31 being executed $n_t$ times (using the new value for n) should provide a non-zero reported time value t(r), which will correspond to the clock incrementation time interval.

With respect to (b), that is, whether the reported time value t(r) generated by the clock resolution determination subsystem 21 only reflects the execution of the code sequence including the selected loop, it will be appreciated that this may not occur in connection with a computer which makes use of conventional multi-tasking operating system, in which the computer executes a number of processes, one of which may comprise the clock resolution determination subsystem 21, on an interleaved basis in diverse time slots. In such a computer, an initial portion of the code sequence, including the lines (i) and (ii) in which the start time t(start) is obtained and saved, and the final portion of the code sequence, including lines (iv) and (v), in which the stop time t(stop) is obtained and saved, may be executed during a later time slot. In that case, the reported time value t(r) that the clock resolution determination subsystem 21 will generate will reflect not only the execution of the selected loop, but also the execution of the other processes in the intervening time slots.

Thus, the assumption above, that the first non-zero reported time value t(r) corresponds to either the clock resolution time interval t(c) or twice t(c) may not be correct. Instead, the first non-zero reported time value t(r) may be a much larger multiple of t(c). However, since the duration of each of the time slots is a multiple of the clock resolution time interval t(c), the clock resolution time interval t(c) will be a divisor of any reported time value t(r) that will be generated during execution of the code sequence 30. Accordingly, if the code sequence 30 is executed so that a sufficiently large number of different non-zero reported time values t(r) are generated, the clock resolution time interval t(c) will be the greatest common divisor of the generated non-zero reported time values t(r).

To determine whether the operating system is a multi-tasking operating system, after the clock resolution determination subsystem 21 determines in step 103 that, for a particular iteration of the code sequence 30, with the selected loop 31 being executed for a particular number of times, provides a non-zero reported time value t(r), it (that is, the clock resolution determination subsystem 21) can repeat that iteration a predetermined number of times. If the reported time values t(r) are fairly consistent, then the clock resolution determination subsystem 21 can determine that the operating system of computer 10 is not a multi-tasking operating system, or at least that it is not multi-tasking the processing of the clock resolution determination subsystem 21 and continue processing with the steps described above in connection with FIG. 4. On the other hand, if the clock resolution determination subsystem 21 determines that the reported time values t(r) are widely inconsistent then the clock resolution determination subsystem 21 can determine that the operating system is a multi-tasking operating system, and that it is multi-tasking the processing of the clock resolution determination subsystem 21. In that case, the clock resolution determination subsystem 21 will proceed to perform the operations depicted in FIG. 5 to use the fact, as described above, that the clock incrementation time interval t(c) is a divisor of any non-zero reported time value t(r).

Figure 5:
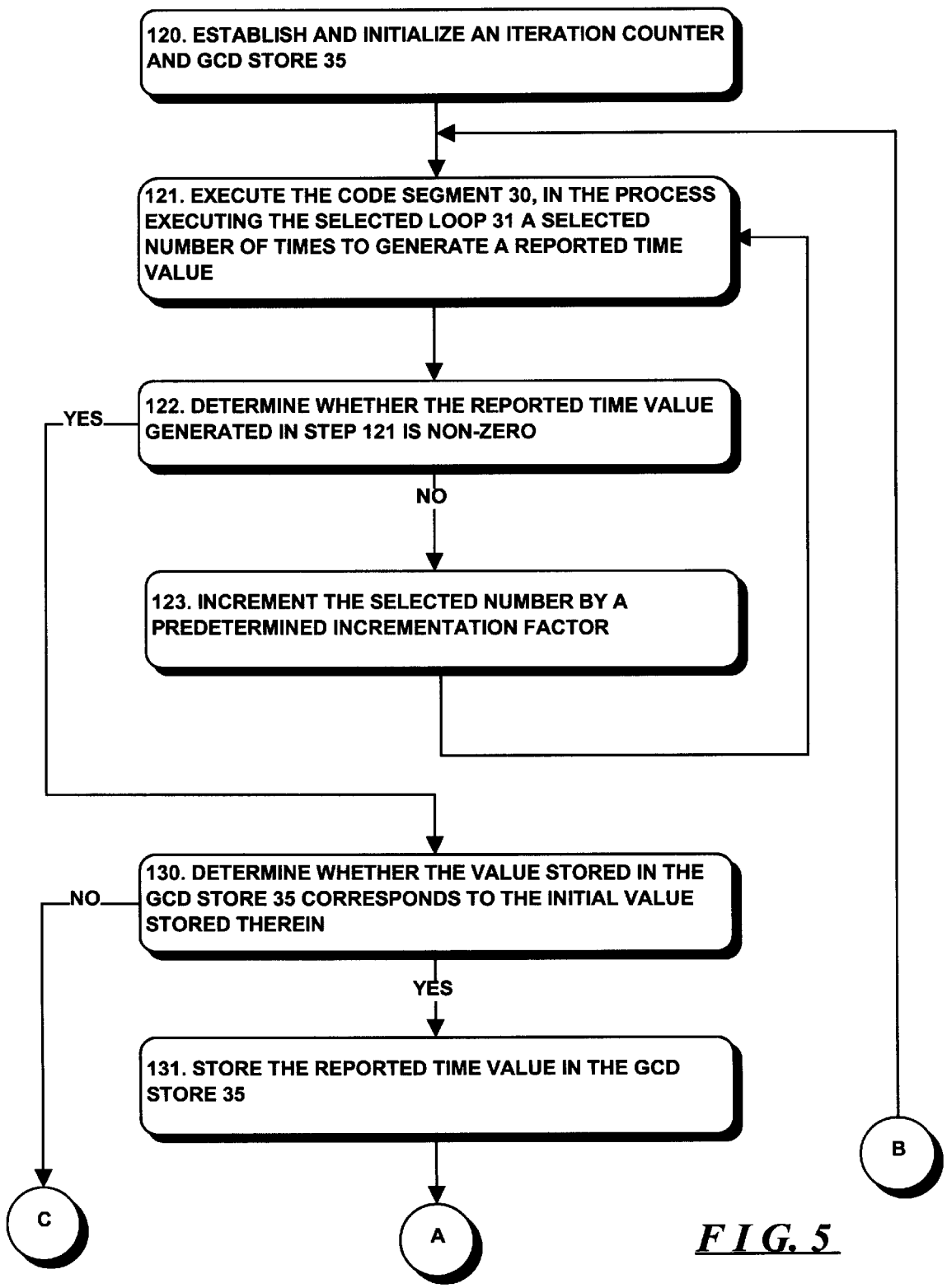
Figure 5A:
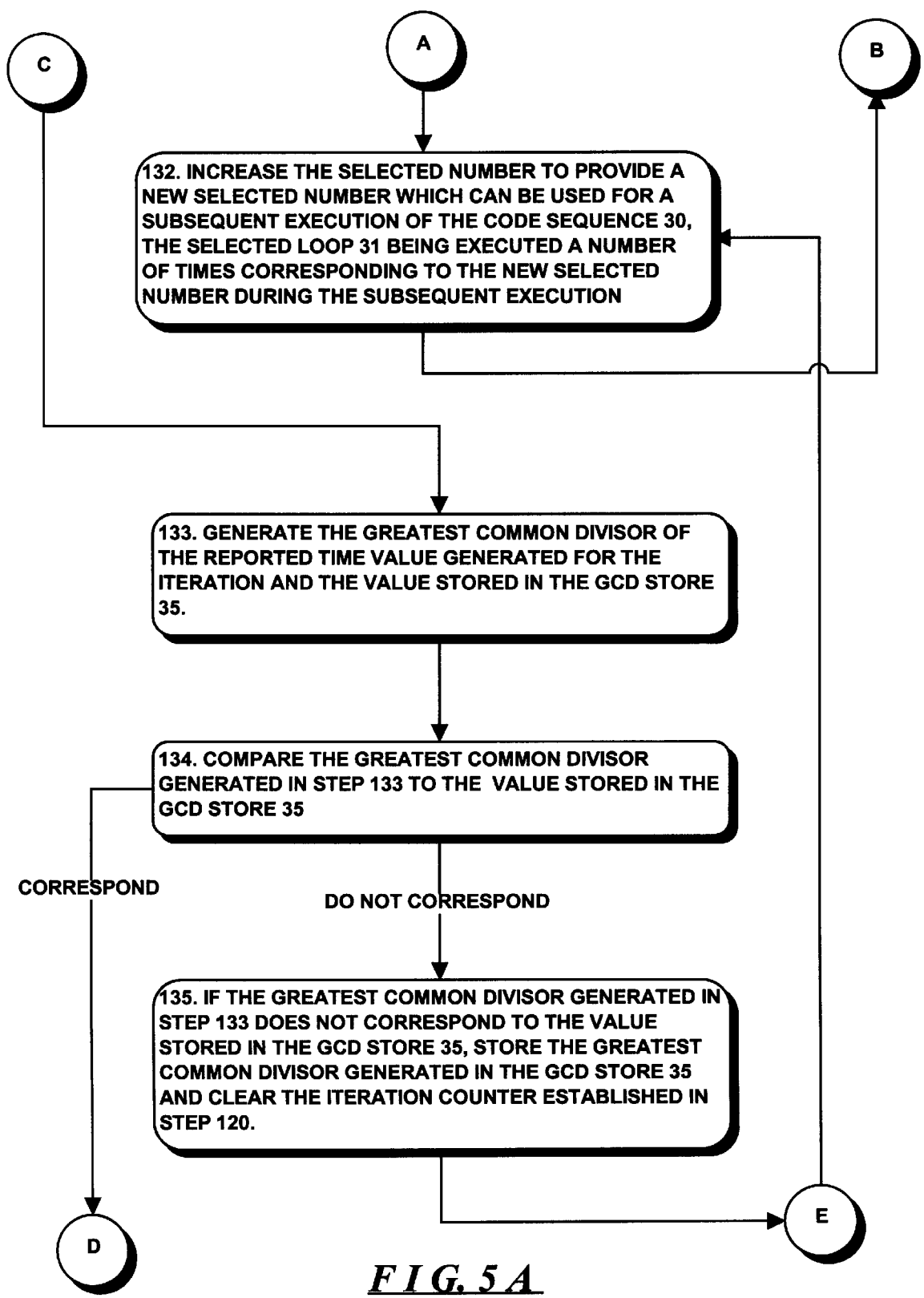
Figure 5B:
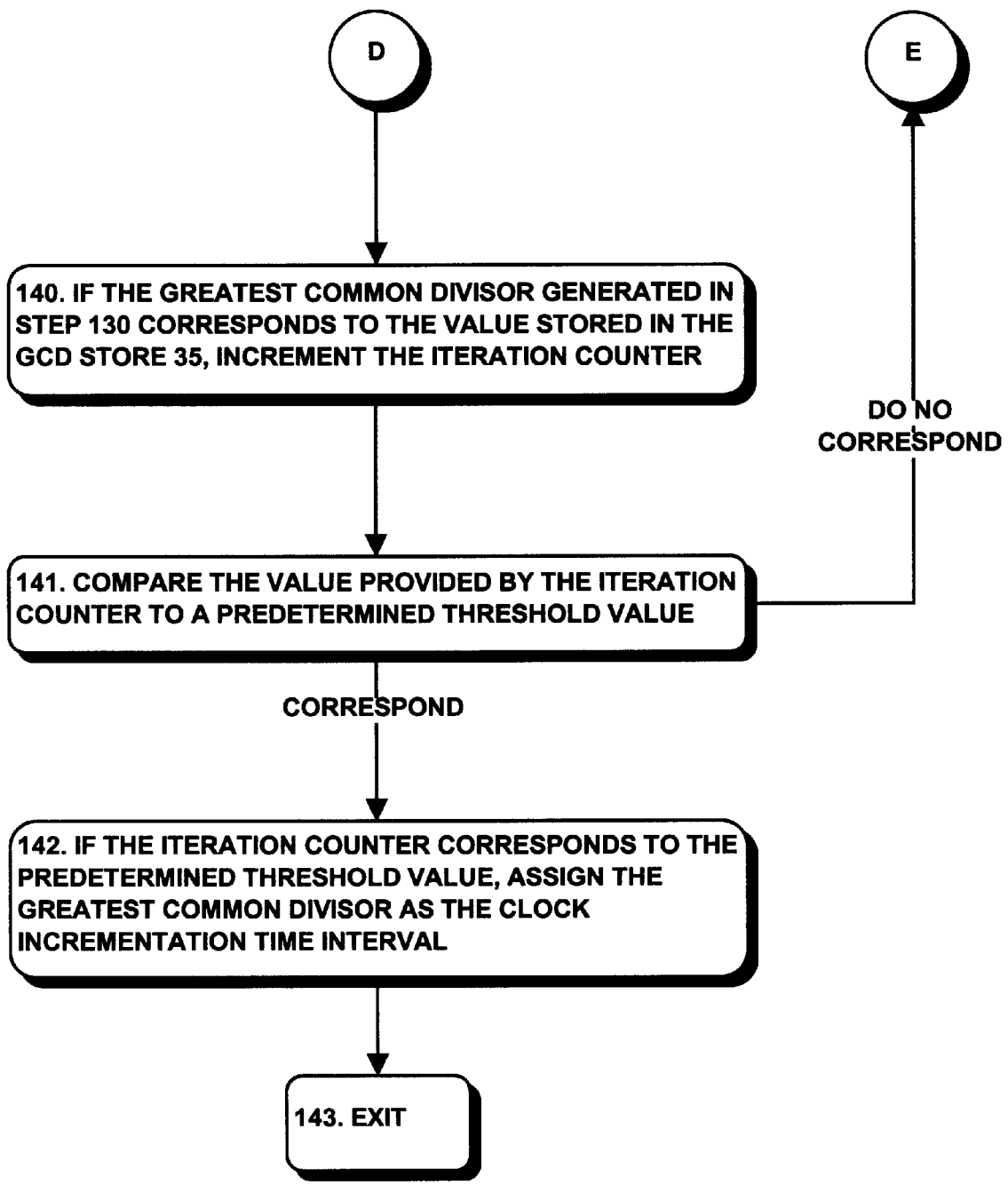

Generally, in the operations depicted in FIG. 5, the clock resolution determination subsystem 21 executes the code sequence 30 over a number of iterations, in the respective iterations varying the number of times it executes the selected loop 31. After each iteration for which a non-zero reported time value t(r) is generated, the clock resolution determination subsystem 21 generates a value which is the greatest common divisor of the value generated for the previous iteration and the reported time value t(r) that is generated for the current iteration. For the first iteration for which a non-zero reported time value t(r) is generated, the clock resolution determination subsystem 21 can use that reported time value t(r) as the initial greatest common divisor to be used in the next iteration. After a sufficiently large number of iterations for which non-zero reported time values t(r) are generated, the greatest common divisor will converge to the clock incrementation time interval t(c). Thus, if, for example, the clock resolution determination subsystem 21 generates the same greatest common divisor for a predetermined number of successive iterations, it (that is, the clock resolution determination subsystem 21) can determine the greatest common divisor to correspond to the clock incrementation time interval t(c).

Thus, and with reference to FIG. 5, the clock resolution determination subsystem 21, after determining that the operating system of computer 10 is a multi-tasking operating system and that it is multi-tasking processing of the clock resolution determination subsystem 21, the clock resolution determination subsystem 21 will establish and initialize the gcd ("greatest common divisor") store 35 for storing the greatest common divisor generated thereby, as well as an iteration counter which the clock resolution determination subsystem 21 will use to determine when it has generated the same greatest common divisor for the predetermined number of successive iterations (step 120). The clock resolution determination subsystem 21 will then execute the code segment 30, in the process executing the selected loop 31 a selected number of times to generate a reported time value t(r) (step 121). Thereafter, the clock resolution determination subsystem 21 will determine whether the reported time value t(r) generated in step 121 is non-zero (step 122). If the clock resolution determination subsystem makes a negative determination in step 122, that is, if it determines that the reported time value t(r) is zero, it will multiply the selected number by a predetermined factor (step 123) and return to step 121 to again execute the code segment 30, in the process executing the selected loop 31 the new selected number of times. In one embodiment, the factor used in step 123 is "two," so that if the reported time value t(r) generated for any execution of the code sequence 30 in step 121 is zero, the number of times the selected loop 31 will be executed during the next execution of code sequence 30 will be doubled.

Returning to step 122, if the clock resolution determination subsystem 21 makes a positive determination in that step, that is, if it determines that the reported time value t(r) generated in step 121 is non-zero, it will sequence to step 130 to determine the greatest common divisor of the reported time value t(r) and the value stored in the gcd store 35 established in step 120. Initially, the clock resolution determination subsystem 21 will determine whether the value stored in the gcd store 35 corresponds to the initial value (step 130) and, if so, will store the reported time value t(r) therein (step 131). It will be appreciated that the clock resolution determination subsystem 21 will make a positive determination in step 130, and store the reported time value t(r) in the gcd store 35, following the first reported time value t(r) which is other than zero.

Following step 131, the clock resolution determination subsystem 21 will increase the selected number to provide a new selected number which can be used for a subsequent execution of the code sequence 30, the selected loop 31 being executed a number of times corresponding to the new selected number during the subsequent execution (step 132). In generating a new selected number at this point, the clock resolution determination subsystem 21 will preferably not double the previous selected number, but instead will increase the selected number by a smaller amount, in which case the greatest common divisor will converge to the clock incrementation time interval faster than if the selected number were merely doubled. In one embodiment, the clock resolution determination subsystem 21 generates the new selected number n' according to $$n' = \max(n+1, \text{floor}(n * \text{factor}, 1)) \quad (12)$$

where "n" is the selected number identifying the number of times the selected loop 31 was executed during the previous iteration of the code sequence 30, "floor" is the floor function as described above, "factor" is a predetermined factor whose value is selected in a manner described below, "max" is the "maximum" function, that is, it provides the larger of "n+1" and "floor(n* factor, 1) and "*" represents the multiplication operation. It will be appreciated that the value of "factor" in equation (12) will be selected to be greater than "1," otherwise the "maximum" function will always provide the value "n+1." However, the value of "factor" should not be so large that the execution time of the code sequence 30 grows too large before sufficient number of iterations "Ns" have provided non-zero reported time values t(r). Generally, if the execution time of the code sequence 30, for any number of times of execution of the selected loop 31, is limited to m*t(c), then $$\text{factor} = m^{\frac{1}{Ns}}. \quad (13)$$

After the new selected number n' is generated in step 132, the clock resolution determination subsystem 21 returns to step 121 to execute the code sequence 30, during the iteration executing the selected loop 31 a number of times corresponding to the new selected number n'.

Returning to step 130, if the clock resolution determination subsystem 21 makes a negative determination in step 130, which will generally occur for the second and subsequent iterations for which non-zero reported time values t(r) are generated, the clock resolution determination subsystem will generate the greatest common divisor of the reported time value t(r) generated for the iteration and the value stored in the gcd store 35 (step 133). In one embodiment, the clock resolution determination subsystem 21 uses the well-known Euclid's algorithm to generate the greatest common divisor in step 133. After generating a greatest common divisor value in step 133, the clock resolution determination subsystem 21 will compare the greatest common divisor generated in step 133 to the value stored in the gcd store 35 (step 134). If the clock resolution determination subsystem 21 determines in step 134 that the greatest common divisor generated in step 133 does not correspond to the value store in the gcd store 35, it will store the greatest common divisor so generated in the gcd store 35 and clear the iteration counter established in step 120 (step 135) and sequence to step 132 to generate a new selected number n' and thereafter return to step 121 to execute the code sequence 30 for another iteration, during the iteration executing the selected loop 31 a number of times corresponding to the new selected number n'.

Returning to step 134, if the clock resolution determination subsystem 21 determines in that step that the greatest common divisor generated in step 130 corresponds to the value stored in the gcd store 35, it will increment the iteration counter (step 140) and compare the value provided by the iteration counter to a predetermined threshold value (step 141). If the value provided by the iteration counter is at least as large as the predetermined threshold value, then the clock resolution determination subsystem 21 will have generated the greatest common divisor to have the same value for a predetermined number of successive iterations, and so it will determine the value of the clock incrementation time interval t(c) to correspond to the greatest common divisor stored in the gcd store 35 (step 142).

On the other hand, if the clock resolution determination subsystem 21 determines in step 141 that the value provided by the iteration counter is less than the predetermined threshold value then it will determine that it (that is, the clock resolution determination subsystem 21) has not generated the greatest common divisor to have the same value for the predetermined number of successive iterations. In that case, the clock resolution determination subsystem 21 will sequence to step 132 to generate a new selected number n' and thereafter return to step 121 to execute the code sequence 30 for another iteration, during the iteration executing the selected loop 31 a number of times corresponding to the new selected number n'.

The clock resolution determination subsystem 21 provides the clock incrementation time interval t(c) to the iteration number determination subsystem 22, which, in turn, uses the clock incrementation time interval t(c) to determine an optimal number of iterations for execution of the code fragment 40 to provide the prescribed timing accuracy for the execution of the code fragment for one iteration, while avoiding excessive execution times. The iteration number determination subsystem 22 includes a maximum time desired register 41, a minimum time desired register 42, a number of code fragment iterations store 43 and an execution control 44. Generally, the minimum time desired register 42 receives a value, which may be provided by an operator, that corresponds to the minimum time that will give timing results for the code fragment 40 with a desired timing accuracy. The minimum time desired value (represented by "T_MIN_DES" in FIG. 2), to be stored in the minimum time desired register 42, will be a selected multiple of the clock resolution, that is, a selected multiple of the clock incrementation time interval t(c) provided by the clock resolution determination subsystem 21. For a desired timing accuracy of, for example, one percent, the minimum time desired value would be on the order of one hundred times the clock incrementation time interval t(c).

The maximum time desired register 41 receives a maximum time desired value (represented by "T_MAX_DES" in FIG. 2), that may also be provided by an operator. The maximum time desired value corresponds to the maximum execution time, also as a multiple of the clock incrementation time value t(c), for execution of the code fragment 40 for the number of times to be determined by the iteration number determination subsystem 22. It will be appreciated that the maximum time desired value will generally represent a time interval that is at least the minimum time desired value T_MIN_DES plus the clock incrementation time interval t(c).

During its operations, the iteration number determination subsystem 22 uses time values provided by the clock interface 23, which are obtained in a manner similar to that described above in connection with the clock resolution determination subsystem 21, at the beginning and end of code fragment execution for the respective number of code fragment iterations. In addition, the iteration number determination subsystem 22 generates time interval values in a manner similar to that described above in connection with the clock resolution determination subsystem 21. In particular, the iteration number determination subsystem 22 makes calls to the clock interface 23, represented by arrow 45, and receives responses, represented by the arrow 46. The timing values received by the iteration number determination subsystem 22 from the clock interface 23 represent a current time to a resolution or granularity corresponding to the clock incrementation time interval t(c). The iteration number determination subsystem 22 generates a time interval value "T" representing the amount of time required to execute the code fragment iterations in the same manner as the clock resolution determination subsystem 21 uses to generate a reported time value t(r) for execution of the code sequence 30, that is, by obtaining current time values at the beginning and end of execution of the code fragment iterations using the appropriate calls to the clock interface 23 and generating the difference therebetween, the difference representing the time interval T. Also as with the reported timing values generated by the clock resolution determination subsystem 21 as described above in connection with FIGS. 3A through 3F and equation (3), the time value T generated by the iteration number determination subsystem 22 for execution of the code fragment for a particular number of code fragment iterations may differ from the actual execution time by ±t(c), and so the iteration number determination subsystem 22 generates the T_MIN and T_MAX values in relation to the time value T as $$T\_MIN = \max(0, T - t(c)) \tag{14},$$

where "max" represents a maximum function, providing the maximum of zero and T-t(c), and $$T\_MAX = T + t(c) \tag{15}.$$

The maximum function is used in equation (14) because time represented by T_MIN cannot be less than zero. Otherwise stated, the actual time for execution of the code fragment may fall into a range between T_MIN and T_MAX.

Using the values T_MIN and T_MAX generated for each iteration, the minimum and maximum desired time values T_MAX_DES and T_MIN_DES as stored in registers 41, and the number of code fragment iterations "N" for the respective iteration, the iteration number determination subsystem 22 generates two possible values N_LO and N_HI for the number N' of code fragment iterations for the next iteration as $$N\_LO = \text{ceiling}\left(N * \frac{T\_MIN\_DES}{T\_MIN}, 1\right) \tag{16}$$

and $$N\_HI = \text{floor}\left(N * \frac{T\_MAX\_DES}{T\_MAX}, 1\right). \tag{17}$$

Figure 6:
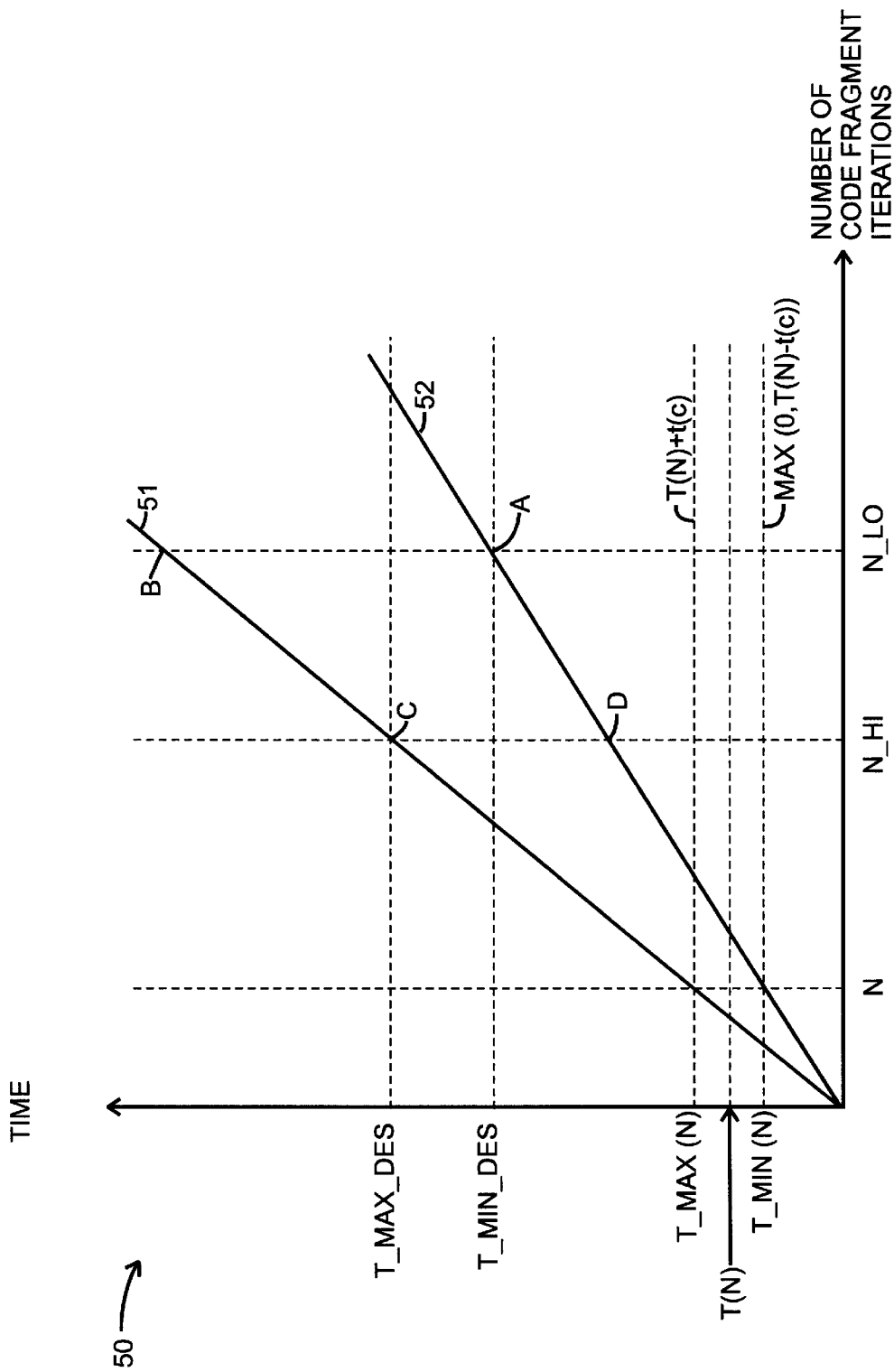
FIG. 6 is a graph useful in understanding the operation of an iteration number determination subsystem comprising a portion of the optimal iteration number determination system depicted in FIG. 2.

This is shown graphically in FIG. 6 for an illustrative example. FIG. 6 depicts a graph 50 having a vertical axis representing time and a horizontal axis representing "N," a number of code fragment iterations. In FIG. 6, execution of the code fragment for "N" iterations results in an execution time interval of "T(N)" (represented by the horizontal dotted line indicated by "T(N)"), and T_MIN(N) and T_MAX(N) are generated according to equations (14) and (15) associated therewith are represented by the dotted lines indicated by T_MIN (N), corresponding to max(0,T(N)-t(c)), and T_MAX(N), corresponding to T(N)+t(c), respectively.

The iteration number determination subsystem 22 selects one of N_LO or N_HI as the number N' of code fragment iterations to be performed during the next iteration. If N_LO is selected as N', the number N of code fragment iterations that would be performed for the next iteration would be related to the number N of code fragment iterations performed during the current iteration, increased by a multiplicative factor corresponding to the ratio of the minimum desired time interval T_MIN_DES and T_MIN generated for the iteration as described above in connection with equation 14. On the other hand, if N_HI is selected, the number N' of code fragment iterations that would be performed for the next iteration would be related to the number N of code fragment iterations performed during the current iteration, increased by a multiplicative factor corresponding to the ratio of the maximum desired time interval T_MAX_DES and T_MAX generated for the iteration as described above in connection with equation 15.

The iteration number determination subsystem 22 selects one of the values N_LO or N_HI as the number N' of code fragment iterations to be performed during the next iteration. With reference to FIG. 6, the extrapolation of expected execution times for the next iteration, based on selection of either N_HI or N_LO, for an illustrative example, is represented by lines in FIG. 6 identified by reference numerals 51 and 52, respectively. Thus, if N_LO is selected, the expected execution time for the iteration may be as low as the time value that is associated with point A, the intersection of line 52 with the dotted line corresponding to the value for the minimum desired time interval T_MIN_DES. However, if N_LO is selected, the expected execution time for the iteration may also be as large as the time value that is associated with point B, which is the point of intersection of line 51 with the dotted line corresponding to the value of N_LO. If the time value associated with point B were less than the maximum desired time interval T_MAX_DES, the iteration number determination subsystem 22 would select N_LO as the number N' of code fragment iterations to be performed during the next iteration. However, if the time value associated with point B is greater than the maximum desired time interval T_MAX_DES, as is the case in the in the illustrative example depicted in FIG. 6, the iteration number determination subsystem 22 will select N_HI as the number N' of code fragment iterations to be performed during the next iteration; this will ensure that the execution time for the next iteration does not exceed the maximum desired time interval T_MAX_DES, although the execution time for the next iteration may be as low as the time corresponding with point D in FIG. 6, that is, the point of intersection of line 52 with the dotted line corresponding to the value of N_HI. Generally, if iteration number determination subsystem 22 determines that a threshold condition $$T\_MAX * \frac{N\_LO}{N} \leq T\_MAX\_DES \quad (18)$$

is satisfied, it will ensure that, if N_LO is selected as the number of code fragment iterations N' to be executed for the next iteration, the execution time interval for the code fragment execution will be less than or equal to the maximum desired time interval T_MAX_DES. Accordingly, if the threshold condition is satisfied, the iteration number determination subsystem 22 will select N_LO as N'. On the other hand, if the iteration number determination subsystem 22 determines that the threshold condition in equation (18) is not satisfied, if N_LO were to be selected as the number of code fragment iterations N' to be executed for the next iteration, the execution time interval for the code fragment execution could possibly be greater than the maximum desired time interval T_MAX_DES. On the other hand, as noted above, if N_HI is selected, the execution time will in any case be less than the maximum desired time interval T_MAX_DES, and so if the threshold condition is not satisfied, the iteration number determination subsystem 22 will select N_HI as N', or N+1 if N_HI equals N.

The iteration number determination subsystem 22 will repeat the iterations until the code fragment's execution time interval "T" is at least as large as the minimum desired time interval T_MIN_DES. The code fragment iteration number N used in the last iteration corresponds to the optimal number of iterations for timing execution of the code fragment on the computer system 10. In addition, the execution time for that last iteration will be useful in providing the timing statistics required for the code fragment.

Figure 7:
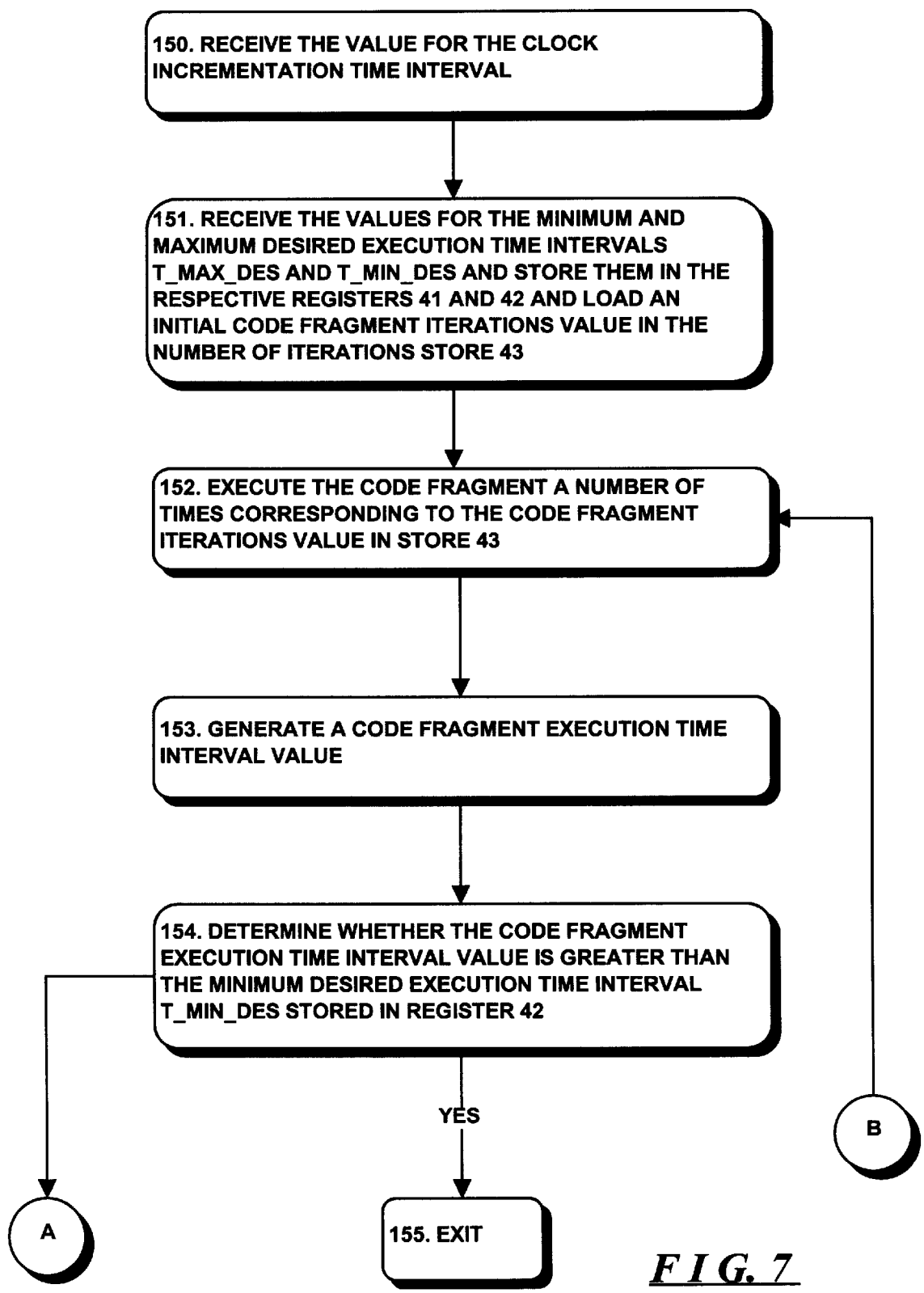
FIG. 7 and 7A are a flowchart depicting operations performed by the iteration number determination subsystem.
Figure 7A:
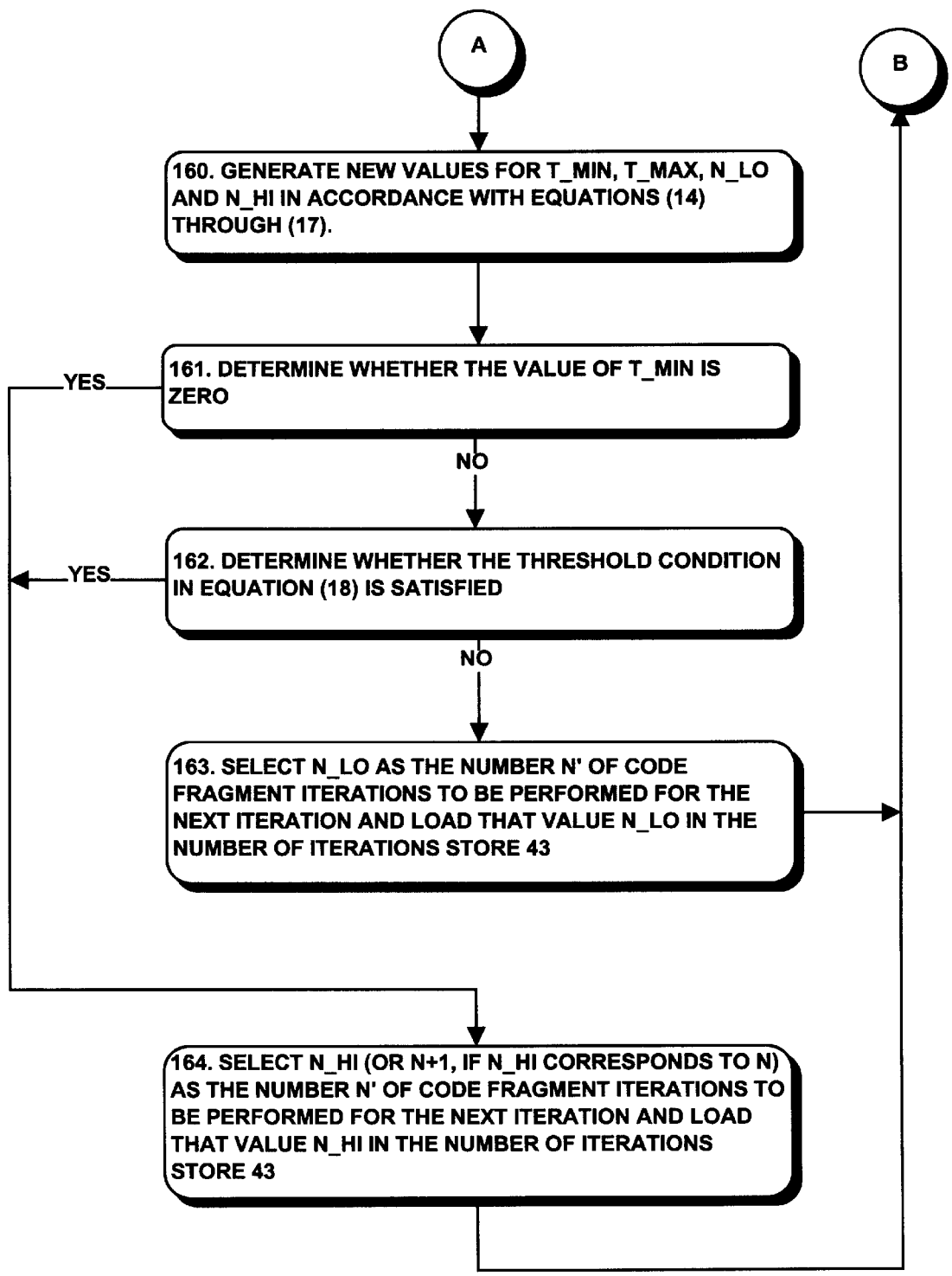

The operations performed by the iteration number determination subsystem 22 will be described in connection with the flowchart depicted in FIG. 7. With reference to FIG. 7, the iteration number determination subsystem 22 initially receives the value for the clock incrementation time interval t(c) from the clock resolution determination subsystem (step 150). In addition, the iteration number determination subsystem 22 receives the values for the minimum and maximum desired execution time intervals T_MAX_DES and T_MIN_DES and stores them in the respective registers 41 and 42 (step 151) and loads an initial code fragment iterations value in the number of iterations store 43. In one embodiment, the initial code fragment iterations value is selected to be "one." Thereafter, the iteration number determination subsystem 22 executes the code fragment 40 a number of times corresponding to the code fragment iterations value in store 43 (step 152) and generates a code fragment execution time interval therefrom (step 153).

After generating the code fragments execution time interval, the iteration number determination subsystem 22 determines whether that interval is greater than the minimum desired execution time interval T_MIN_DES stored in register 42 (step 154). If so, the number of iterations value in store 43 corresponds to the optimal number of code fragment iterations, and so the iteration number determination subsystem 22 can exit (step 155).

Returning to step 154, if the iteration number determination subsystem 22 determines in that step that the code fragments execution time interval is not greater than the minimum desired execution time interval T_MIN_DES, it will sequence to step 160 to generate new values for T_MIN, T_MAX, N_LO and N_HI in accordance with equations (14) through 17). Thereafter, the iteration number determination subsystem 22 determines whether the value N_LO corresponds to zero (step 161) and if not proceeds to determine whether the threshold condition in equation (18) is satisfied (step 162) and, if so, will select N_LO as the number N' of code fragment iterations to be performed for the next iteration and load that value N_LO in the number of iterations store 43 (step 163). Thereafter, the iteration number determination subsystem 22 will return to step 152 for the next iteration.

Returning to steps 161 and 162, if the iteration number determination subsystem 22 determines in that step that the value N_LO corresponds to zero (in step 161) or that the threshold condition in equation (18) is satisfied (in step 162), it will select N_HI as the number N' of code fragment iterations to be performed for the next iteration and load that value N_HI in the number of iterations store 43 (step 164). Thereafter, the iteration number determination subsystem 22 will return to step 152 for the next iteration.

The optimal iteration number determination system provides a number of benefits. In particular, it provides a system and method for determining an optimal number of iterations a code fragment should be executed to provide optimal timing accuracy statistics, without requiring an excessive number of iterations, on computer systems having widely diverse clock resolutions or granularities. In addition, it provides a system and method for determining the resolution or granularity of the clock provided by respective computer systems.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A system for facilitating determination of accurate timing of execution of a computer program fragment by a digital computer comprising:
   A. a clock resolution determination subsystem configured to determine a clock resolution value representing a resolution of a clock provided by the digital computer; and
   B. an iteration number determination subsystem configured to use the clock resolution value, and maximum and minimum desired time interval values in determining an iteration number value, the iteration number representing a number of iterations for execution of the computer program fragment to provide accurate timing of the computer program fragment by the digital computer.

2. A system as defined in claim 1 in which at least one of said minimum desired time interval value and said maximum desired time interval value is provided by an operator.

3. A system as defined in claim 1 in which said clock resolution determination subsystem comprises:
   A. a code sequence having an initial current time call configured to obtain a current time value from the digital computer, a selected loop, and a final current time call configured to obtain said current time value from the digital computer;
   B. an execution control module comprising:
      i. a code sequence execution control configured to enable execution of said code sequence with the selected loop being executed a selected number of selected loop iterations;
      ii. a reported time interval value generator configured to generate a reported time interval representing a difference between the current time values provided by the digital computer in response to the initial and final current time calls during execution of said code sequence;
      iii. an iteration control configured to enable the code sequence execution control and the reported time interval value generator in a series of code sequence iterations; and
      iv. a clock resolution value generator configured to generate the clock resolution value in relation to the reported time values generated by the reported time interval value generator for the respective code sequence iterations.

4. A system as defined in claim 3 in which
   A. the iteration control is configured to change the selected number in successive iterations; and
   B. the clock resolution value generator is configured to generate the clock resolution value to have a predetermined minimum value in response to a determination that the reported time interval value has the predetermined minimum value.

5. A system as defined in claim 4 in which said predetermined minimum value is "one."

6. A system as defined in claim 3:
   A. further comprising a bound value corresponding to the largest number of selected loop iterations whose execution time would not exceed the clock resolution;
   B. in which the iteration control is configured to enable the code sequence execution control to, in each code sequence iteration, execute the code sequence with the selected loop being executed for the selected number of loop iterations, the selected number corresponding to the bound value; and
   C. in which the clock resolution value generator is configured to generate the clock resolution value to correspond to a non-zero reported time value.

7. A system as defined in claim 3 in which said clock resolution value generator is configured to generate the clock resolution value in relation to a greatest common divisor among reported time values generated by the reported time interval value generator.

8. A system as defined in claim 3 in which the selected loop is selected so that the execution time for one selected loop iteration is shorter than the resolution of the clock provided by the digital computer.

9. A system as defined in claim 1 in which said iteration number determination subsystem comprises:
   A. a code fragment execution control configured to obtain an initial current time value from the digital computer, control execution of said code fragment in a selected number of code fragment iterations, and obtain a final current time value from the digital computer;
   B. a reported execution time interval generator configured to generate a reported time interval representing a difference between the initial and final current time values;
   C. a maximum and minimum time value generator configured to generate respective maximum and minimum time values in relation to the reported time interval and the clock resolution value;
   D. a maximum and minimum selected number update generator configured to generate respective maximum and minimum selected number update values in relation to the selected code fragment iteration number, respective maximum and minimum time values and the maximum and minimum desired time values;
   E. a update value selector configured to select one of the respective maximum and minimum selected number update values in relation to the maximum desired time value; and
   F. an iteration control configured to control the code fragment execution control, reported execution time interval generator, maximum and minimum time value generator, maximum and minimum selected number update generator and update value selector through a plurality of iterations, the number of iterations being in relation to the minimum desired time value.

10. A clock resolution determination system for determining a clock resolution value for a clock provided by a digital computer, the clock resolution determination system comprising:

A. a code sequence having an initial current time call configured to obtain an initial current time value from the digital computer, a selected loop, and a final current time call configured to obtain a final current time value from the digital computer;

B. an execution control module comprising:
 i. a code sequence execution control configured to enable execution of said code sequence with the selected loop being executed a selected number of selected loop iterations;
 ii. a reported time interval value generator configured to generate a reported time interval representing a difference between the initial and final current time values;
 iii. an iteration control configured to enable the code sequence execution control and the reported time interval value generator in a series of code sequence iterations, and
 iv. a clock resolution value generator configured to generate the clock resolution value in relation to the reported time values generated by the reported time interval value generator for the respective code sequence iterations.

11. A system as defined in claim 10 in which
A. the iteration control is configured to change the selected number in successive iterations; and
B. the clock resolution value generator is configured to generate the clock resolution value to have a predetermined minimum value in response to a determination that the reported time interval value has the predetermined minimum value.

12. A system as defined in claim 11 in which said predetermined minimum value is "one."

13. A system as defined in claim 10:
A. further comprising a bound value corresponding to the largest number of selected loop iterations whose execution time would not exceed the clock resolution;
B. and further in which:
 i. the iteration control is configured to enable the code sequence execution control to, in each code sequence iteration, execute the code sequence with the selected loop being executed for the selected number of loop iterations, the selected number corresponding to the bound value; and
 ii. the clock resolution value generator is configured to generate the clock resolution value to correspond to a non-zero reported time value.

14. A system as defined in claim 10 in which said clock resolution value generator is configured to generate the clock resolution value in relation to a greatest common divisor among reported time values end by the reported time interval value generator.

15. A system as defined in claim 10 in which the selected loop is selected so that the execution time for one selected loop iteration is shorter than the resolution of the clock provided by the digital computer.

16. An iteration number determination system for facilitating determination of accurate timing of execution of a computer program fragment by a digital computer comprising:

A. a code fragment execution control configured to obtain an initial current time value from the digital computer, control execution of said code fragment in a selected number of code fragment iterations, and obtain a final current time value from the digital computer;

B. a reported execution time interval generator configured to generate a reported time interval representing a difference between the initial and final current time values;

C. a maximum and minimum time value generator configured to generate respective maximum and minimum time values in relation to the reported time interval and a clock resolution value representative of a clock resolution of a clock provided by the digital computer;

D. a maximum and minimum selected number update generator configured to generate respective maximum and minimum selected number update values in relation to the selected code fragment iteration number, respective maximum and minimum time values and the maximum and minimum desired time values;

E. a update value selector configured to select one of the respective maximum and minimum selected number update values in relation to the maximum desired time value; and F. an iteration control configured to control the code fragment execution control, reported execution time interval generator, maximum and minimum time value generator, maximum and minimum selected number update generator and update value selector through a plurality of iterations, the number of iterations being in relation to the minimum desired time value.

17. A method of facilitating determination of accurate timing of execution of a computer program fragment by a digital computer comprising:
A. determining a clock resolution value representing a resolution of a clock provided by the digital computer; and
B. using the clock resolution value, and maximum and minimum desired time interval values to determine an iteration number value, the iteration number representing a number of iterations for execution of the computer program fragment to provide accurate timing of the computer program fragment by the digital computer.

18. A method as defined in claim 17 in which at least one of said minimum desired time interval value and said maximum desired time interval value is provided by an operator.

19. A method as defined in claim 17 in which said clock resolution determination step comprises the steps of:
A. enabling execution of a code sequence, the code sequence having an initial current time call configured to obtain an initial current time value from the digital computer, a selected loop, and a final current time call configured to obtain a final current time value from the digital computer, with the selected loop being executed a selected number of selected loop iterations;
B. generating a reported time interval representing a difference between the initial and final current time values;
C. controlling performance of the code sequence execution step and the reported time interval value generation step in a series of code sequence iterations; and
D. generating the clock resolution value in relation to the reported time values generated during the reported time interval value generation step for the respective code sequence iterations.

20. A method as defined in claim 19 in which
A. the selected number is changed in successive iterations; and
B. in the clock resolution value generation step, the clock resolution value is generated to have a predetermined minimum value in response to a determination that the reported time interval value has the predetermined minimum value.

21. A method as defined in claim 20 in which said predetermined minimum value is "one."

22. A method as defined in claim 19:
  A. further comprising a bound value generating step to generate a bound value corresponding to the largest number of selected loop iterations whose execution time would not exceed the clock resolution;
  B. in the code sequence execution control step, in each code sequence iteration, the code sequence is executed such that the selected loop being executed for the selected number of loop iterations, the selected number corresponding to the bound value; and
  C. in the clock resolution value generation step, the clock resolution value is generated to correspond to a non-zero reported time value.

23. A method as defined in claim 19 in which said clock resolution value generation step includes the step of generating the clock resolution value in relation to a greatest common divisor among reported time values generated during the reported time interval value generation step.

24. A method as defined in claim 19 in which the selected loop is selected so that the execution time for one selected loop iteration is shorter than the resolution of the clock provided by the digital computer.

25. A method as defined in claim 17 in which said iteration number determination step includes the steps of:
  A. obtaining an initial current time value from the digital computer, controlling execution of said code fragment in a selected number of code fragment iterations, and obtaining a final current time value from the digital computer;
  B. generating a reported time interval representing a difference between the current time values provided by the digital computer in response to the initial and final current time values;
  C. generating respective maximum and minimum time values in relation to the reported time interval and the clock resolution value;
  D. generating respective maximum and minimum selected number update values in relation to the selected code fragment iteration number, respective maximum and minimum time values and the maximum and minimum desired time values;
  E. selecting one of the respective maximum and minimum selected number update values in relation to the maximum desired time value; and
  F. controlling the code fragment execution control step, the reported execution time interval generation step, the maximum and minimum time value generation step, the maximum and minimum selected number update generation step and the update value selection step through a plurality of iterations, the number of iterations being in relation to the minimum desired time value.

26. A method of determining a clock resolution value for a clock provided by a digital computer, the clock resolution determination method comprising the steps of:
  A. enabling execution of a code sequence, the code sequence having an initial current time call configured to obtain an initial current time value from the digital computer, a selected loop, and a final current time call configured to obtain a final current time value from the digital computer, with the selected loop being executed a selected number of selected loop iterations;
  B. generating a reported time interval representing a difference between the initial and final current time values;
  C. controlling performance of the code sequence execution step and the reported time interval value generation step in a series of code sequence iterations; and
  D. generating the clock resolution value in relation to the reported time values generated during the reported time interval value generation step for the respective code sequence iterations.

27. A method as defined in claim 26 in which
  A. the selected number is changed in successive iterations; and
  B. in the clock resolution value generation step, the clock resolution value is generated to have a predetermined minimum value in response to a determination that the reported time interval value has the predetermined minimum value.

28. A method as defined in claim 27 in which said predetermined minimum value is "one."

29. A method as defined in claim 26:
  A. further comprising a bound value generating step to generate a bound value corresponding to the largest number of selected loop iterations whose execution time would not exceed the clock resolution;
  B. in the code sequence execution control step, in each code sequence iteration, the code sequence is executed such that the selected loop being executed for the selected number of loop iterations, the selected number corresponding to the bound value; and
  C. in the clock resolution value generation step, the clock resolution value is generated to correspond to a non-zero reported time value.

30. A method as defined in claim 26 in which said clock resolution value generation step includes the step of generating the clock resolution value in relation to a greatest common divisor among reported time values generated during the reported time interval value generation step.

31. A method as defined in claim 26 in which the selected loop is selected so that the execution time for one selected loop iteration is shorter than the resolution of the clock provided by the digital computer.

32. A method of facilitating the accurately timing of execution of a computer program fragment by a digital computer comprising the steps of:
  A. obtaining an initial current time value from the digital computer, controlling execution of said code fragment in a selected number of code fragment iterations, and obtaining a final current time value from the digital computer;
  B. generating a reported time interval representing a difference between the initial and final current time values;
  C. generating respective maximum and minimum time values in relation to the reported time interval and a clock resolution value representative of a clock resolution of a clock provided by the digital computer;
  D. generating respective maximum and minimum selected number update values in relation to the selected code fragment iteration number, respective maximum and minimum time values and the maximum and minimum desired time values;
  E. selecting one of the respective maximum and minimum selected number update values in relation to the maximum desired time value; and
  F. controlling the code fragment execution control step, the reported execution time interval generation step, the maximum and minimum time value generation step, the maximum and minimum selected number update generation step and the update value selection step through a plurality of iterations, the number of iterations being in relation to the minimum desired time value.

33. A computer program product for use in connection with a digital computer for facilitating determination of accurate timing of execution of a computer program fragment by the digital computer, the computer program product comprising a computer-readable medium having encoded thereon:
   A. a clock resolution determination module configured to enable the computer to determine a clock resolution value representing a resolution of a clock provided by the digital computer; and
   B. an iteration number determination module configured to enable the computer to use the clock resolution value, and maximum and minimum desired time interval values in determining an iteration number value, the iteration number representing a number of iterations for execution of the computer program fragment to provide accurate timing of the computer program fragment by the digital computer.

34. A computer program product as defined in claim 33 in which at least one of said maximum desired time interval value and said minimum desired time interval value is provided by an operator.

35. A computer program product as defined in claim 33 in which said clock resolution determination module comprises:
   A. a code sequence execution control module configured to enable the computer to execute a code sequence, the code sequence having an initial current time call configured to obtain a current time value from the digital computer, a selected loop, and a final current time call configured to obtain said current time value from the digital computer with the selected loop being executed a selected number of selected loop iterations;
   B. a reported time interval value generator module configured to enable the computer to generate a reported time interval representing a difference between the initial and final current time values;
   C. an iteration control module configured to enable the computer to process the code sequence execution control module and the reported time interval value generator module in a series of code sequence iterations; and
   D. a clock resolution value generator module configured to enable the computer to generate the clock resolution value in relation to the reported time values generated by the reported time interval value generator module for the respective code sequence iterations.

36. A computer program product as defined in claim 35 in which
   A. the iteration control module is configured to enable the computer to change the selected number in successive iterations; and
   B. the clock resolution value generator module is configured to enable the computer to generate the clock resolution value to have a predetermined minimum value in response to a determination that the reported time interval value has the predetermined minimum value.

37. A computer program product as defined in claim 36 in which said predetermined minimum value is "one."

38. A computer program product as defined in claim 35:
   A. further comprising a bound value module configured to enable the computer to generate a bound value corresponding to the largest number of selected loop iterations whose execution time would not exceed the clock resolution;
   B. the iteration control module is configured to enable the computer to, in each code sequence iteration, execute the code sequence with the selected loop being executed for the selected number of loop iterations, the selected number corresponding to the bound value; and
   C. the clock resolution value generator module is configured to enable the computer to generate the clock resolution value to correspond to a non-zero reported time value.

39. A computer program product as defined in claim 35 in which said clock resolution value generator module is configured to enable the computer to generate the clock resolution value in relation to a greatest common divisor among reported time values generated during processing enabled by the reported time interval value generator module.

40. A computer program product as defined in claim 35 in which the selected loop is selected so that the execution time for one selected loop iteration is shorter than the resolution of the clock provided by the digital computer.

41. A computer program product as defined in claim 33 in which said iteration number determination module comprises:
   A. a code fragment execution control module configured to enable the computer to obtain an initial current time value from the digital computer, control execution of said code fragment in a selected number of code fragment iterations, and obtain a final current time value from the digital computer;
   B. a reported execution time interval generator module configured to enable the computer to generate a reported time interval representing a difference between the initial and final current time values;
   C. a maximum and minimum time value generator module configured to enable the computer to generate respective maximum and minimum time values in relation to the reported time interval and the clock resolution value;
   D. a maximum and minimum selected number update generator module configured to enable the computer to generate respective maximum and minimum selected number update values in relation to the selected code fragment iteration number, respective maximum and minimum time values and the maximum and minimum desired time values;
   E. a update value selector module configured to enable the computer to select one of the respective maximum and minimum selected number update values in relation to the maximum desired time value; and
   F. an iteration control module configured to enable the computer to control processing of the code fragment execution control module, the reported execution time interval generator module, the maximum and minimum time value generator module, the maximum and minimum selected number update generator module and the update value selector module through a plurality of iterations, the number of iterations being in relation to the minimum desired time value.

42. A clock resolution determination computer program product for enabling a computer to determine a clock resolution value for a clock provided by the digital computer, the clock resolution determination computer program product comprising a computer-readable medium having encoded thereon:

A. a code sequence execution control module configured to enable the computer to execute a code sequence, the code sequence having an initial current time call configured to obtain an initial current time value from the digital computer, a selected loop, and a final current time call configured to obtain a final current time value from the digital computer with the selected loop being executed a selected number of selected loop iterations;

B. a reported time interval value generator module configured to enable the computer to generate a reported time interval representing a difference between the initial and final current time values;

C. an iteration control module configured to enable the computer to process the code sequence execution control module and the reported time interval value generator module in a series of code sequence iterations, and D. a clock resolution value generator module configured to enable the computer to generate the clock resolution value in relation to the reported time values generated by the reported time interval value generator module for the respective code sequence iterations.

43. A computer program product as defined in claim 42 in which

A. the iteration control module is configured to enable the computer to change the selected number in successive iterations; and B. the clock resolution value generator module is configured to enable the computer to generate the clock resolution value to have a predetermined minimum value in response to a determination that the reported time interval value has the predetermined minimum value.

44. A computer program product as defined in claim 43 in which said predetermined minimum value is "one."

45. A computer program product as defined in claim 42:

A. further comprising a bound value module configured to enable the computer to generate a bound value corresponding to the largest number of selected loop iterations whose execution time would not exceed the clock resolution;

B. the iteration control module is configured to enable the computer to, in each code sequence iteration, execute the code sequence with the selected loop being executed for the selected number of loop iterations, the selected number corresponding to the bound value; and C. the clock resolution value generator module is configured to enable the computer to generate the clock resolution value to correspond to a non-zero reported time value.

46. A computer program product as defined in claim 42 in which said clock resolution value generator module is configured to enable the computer to generate the clock resolution value in relation to a greatest common divisor among reported time values generated during processing enabled by the reported time interval value generator module.

47. A computer program product as defined in claim 42 in which the selected loop is selected so that the execution time for one selected loop iteration is shorter than the resolution of the clock provided by the digital computer.

48. A computer program product for use in connection with a digital computer for facilitating determination of accurate timing of execution of a computer program fragment by the digital computer, the computer program product comprising a computer-readable medium having encoded thereon:

A. a code fragment execution control module configured to enable the computer to obtain an initial current time value from the digital computer, control execution of said code fragment in a selected number of code fragment iterations, and obtain a final current time value from the digital computer;

B. a reported execution time interval generator module configured to enable the computer to generate a reported time interval representing a difference between the initial and final current time values;

C. a maximum and minimum time value generator module configured to enable the computer to generate respective maximum and minimum time values in relation to the reported time interval and a clock resolution value representative of a clock resolution of a clock provided by the digital computer;

D. a maximum and minimum selected number update generator module configured to enable the computer to generate respective maximum and minimum selected number update values in relation to the selected code fragment iteration number, respective maximum and minimum time values and the maximum and minimum desired time values;

E. a update value selector module configured to enable the computer to select one of the respective maximum and minimum selected number update values in relation to the maximum desired time value; and F. an iteration control module configured to enable the computer to control processing of the code fragment execution control module, the reported execution time interval generator module, the maximum and minimum time value generator module, the maximum and minimum selected number update generator module and the update value selector module through a plurality of iterations, the number of iterations being in relation to the minimum desired time value.

\* \* \* \* \*